(12) United States Patent
Hatayama

(10) Patent No.: US 11,875,474 B2
(45) Date of Patent: Jan. 16, 2024

(54) PROTRACTOR IMAGE CHANGING METHOD, PROTRACTOR IMAGE CHANGING APPARATUS AND SERVER APPARATUS

(71) Applicant: CASIO COMPUTER CO., LTD., Tokyo (JP)

(72) Inventor: Takashi Hatayama, Fussa (JP)

(73) Assignee: CASIO COMPUTER CO., LTD., Tokyo (JP)

(*) Notice: Subject to any disclaimer, the term of this patent is extended or adjusted under 35 U.S.C. 154(b) by 835 days.

(21) Appl. No.: 16/826,391

(22) Filed: Mar. 23, 2020

(65) Prior Publication Data
US 2020/0311866 A1    Oct. 1, 2020

(30) Foreign Application Priority Data

Mar. 26, 2019  (JP) ................................. 2019-059079
Sep. 20, 2019  (JP) ................................. 2019-171269
Mar. 3, 2020   (JP) ................................. 2020-036010

(51) Int. Cl.
   *G06T 3/40*    (2006.01)
   *G06T 3/60*    (2006.01)

(52) U.S. Cl.
   CPC ............. *G06T 3/40* (2013.01); *G06T 3/60* (2013.01); *G06T 2200/24* (2013.01)

(58) Field of Classification Search
   CPC ......... G06T 3/40; G06T 3/60; G06T 2200/24; G06T 11/60; G01B 3/563
   See application file for complete search history.

(56) References Cited

U.S. PATENT DOCUMENTS 7,773,829 B1 *  8/2010  Brandt ................... G09B 11/00
                                                    33/735
9,372,621 B2 *  6/2016  Wu ........................ G06F 3/0484
                         (Continued)

FOREIGN PATENT DOCUMENTS

CN    107589937 A  *  1/2018
JP    H0581391 A   *  9/1991
                  (Continued)

OTHER PUBLICATIONS

Shaowen Ding et al., Large Scale Object's Measurement Method Research Based on Multi-view Reconstruction, Jun. 1, 2017, International Conference on Image, Vision and Computing, pp. 555-558 (Year: 2017).*

(Continued)

*Primary Examiner* — Tam T Tran
(74) *Attorney, Agent, or Firm* — SCULLY SCOTT MURPHY & PRESSER, PC

(57) ABSTRACT

A protractor image changing method includes: acquiring an image of a protractor having a plurality of indices used for measurement; determining whether a size change instruction or a shape change instruction for the image of the protractor has been received; when it is determined that the size change instruction or the shape change instruction for the image of the protractor has been received, performing a first change process for changing a size or shape of the image of the protractor based on whether the received instruction is the size change instruction or the shape change instruction, and a second change process for changing a mode of the indices of the image of the protractor to a mode based on the received instruction; and outputting the image of the protractor in which the size or shape and the mode of the indices are changed or data of the image.

16 Claims, 16 Drawing Sheets

(56) References Cited

U.S. PATENT DOCUMENTS

| | | | |
|---|---|---|---|
| 10,540,084 B2* | 1/2020 | Wareing | G06F 9/54 |
| 10,579,237 B2* | 3/2020 | Hatfield | G06F 3/04883 |
| 10,691,316 B2* | 6/2020 | Hatfield | G06T 3/0068 |
| 11,182,067 B2* | 11/2021 | Wareing | G06F 3/0488 |
| 2013/0050072 A1* | 2/2013 | Natori | G06F 3/03545 |
| | | | 345/156 |
| 2014/0033098 A1* | 1/2014 | Uota | G06F 3/0488 |
| | | | 715/765 |
| 2014/0078082 A1* | 3/2014 | Wu | G06F 3/0484 |
| | | | 345/173 |
| 2016/0357430 A1* | 12/2016 | Migos | G06F 3/0481 |
| 2017/0263034 A1* | 9/2017 | Kenoff | G06F 3/04842 |
| 2017/0285919 A1* | 10/2017 | Hatfield | G06T 3/0068 |
| 2017/0285920 A1* | 10/2017 | Hatfield | G06T 11/203 |
| 2017/0315692 A1* | 11/2017 | Wareing | G06F 3/04845 |
| 2020/0150844 A1* | 5/2020 | Wareing | G06F 9/451 |

FOREIGN PATENT DOCUMENTS

| | | | |
|---|---|---|---|
| JP | H05-81391 A | | 4/1993 |
| JP | H06-020022 A | | 1/1994 |
| JP | 2000-048220 A | | 2/2000 |
| JP | 2003-123088 A | | 4/2003 |
| JP | 2006-339696 A | | 12/2006 |
| JP | 2008-054234 A | | 3/2008 |
| JP | 2010-284797 A | | 12/2010 |
| JP | 2012088768 A | * | 5/2012 |
| JP | 2013-120560 A | | 6/2013 |
| JP | 2014-006693 A | | 1/2014 |
| JP | 2014006693 A | * | 1/2014 |
| JP | 2014149815 A | * | 8/2014 |
| KR | 1020180040955 A | * | 4/2018 |

OTHER PUBLICATIONS

Wei Chen et al., Visual Protractor Based Localization Algorithm for Mobile Robot, Oct. 1, 2006, International Conference on Intelligent Systems Design and Applications, pp. 1-5 (Year: 2006).*

Notice of Reasons for Refusal dated May 10, 2022 received in Japanese Patent Application No. JP 2020-036010 together with an English language translation.

Realize Your Potential. [online]. Savvas Learning Company LLC, 2020 [retrieved on Apr. 13, 2020]. Retrieved from the Internet:<URL: www.pearsonrealize.com/index.html>.

Desmos—User Guide. [online]. Desmos. [retrieved on Apr. 22, 2020]. Retrieved from the Internet: <URL: https://s3.amazonaws.com/desmos/Desmos_Calculator_User_Guide.pdf>.

* cited by examiner

FIG. 7

| MODE OF INDEX | MAGNIFICATION | | | |
|---|---|---|---|---|
| | LARGE SCALE (°) | MEDIUM SCALE (°) | SMALL SCALE (°) | NUMERICAL VALUE LABEL (°) |
| 0.75 | 10 | 5 | NON-DISPLAY | 30 |
| 1.00 | 10 | 5 | 1 | 10 |
| 1.25 | 10 | 5 | 1 | 5 |

PROTRACTOR IMAGE CHANGING METHOD, PROTRACTOR IMAGE CHANGING APPARATUS AND SERVER APPARATUS

CROSS-REFERENCE TO RELATED APPLICATIONS

The present application claims priority from Japanese patent application JP 2019-059079, filed on Mar. 26, 2019, Japanese patent application JP 2019-171269, filed on Sep. 20, 2019, and Japanese patent application JP 2020-036010, filed on Mar. 3, 2020, the contents of which are hereby incorporated by reference into this application.

TECHNICAL FIELD

The technical field relates to a protractor image changing method, a protractor image changing apparatus, and a server apparatus.

DESCRIPTION OF RELATED ART

When an angle or a length of a figure drawn on a computer display is desired to be measured, a method is conceivable in which the angle and length of the drawn figure are calculated and output by a function provided in advance in a program operating on the computer.

There are also computer network websites that provide a service of drawing an arbitrary figure and measuring the angle of an arbitrary position in the figure.

However, for example, even in service technologies such as Desmos (searched on Mar. 25, 2019) on the Internet <URL: https://www.desmos.com/geometry>, only an angle in a corresponding figure is displayed by specifying the point position, and it does not correspond to a measurement that simulates a measuring instrument having a scale of the related art, such as a protractor.

For example, when an image of a measuring instrument having a scale is displayed and the display size of the measuring instrument is changed while a step value of the scale is kept constant, if the display size of the image of the measuring instrument is reduced, the scale is too fine, and thus visibility becomes low and it becomes difficult to measure. On the other hand, if the size is increased, there is a problem that the scale may be too coarse and the measurement may not be performed accurately.

The present invention has been made in view of the above circumstances, and its purpose is to provide a protractor image changing method, a protractor image changing apparatus, and a server apparatus for appropriately changing a display mode of a scale depending on a deformation instruction to display, when receiving the deformation instruction for an image of a measuring instrument having a scale.

BRIEF SUMMARY

A protractor image changing method of the present disclosure includes: acquiring an image of a protractor having a plurality of indices used for measurement; determining whether a size change instruction or a shape change instruction for the image of the protractor has been received; when it is determined that the size change instruction or the shape change instruction for the image of the protractor has been received, performing a first change process for changing a size or shape of the image of the protractor based on whether the received instruction is the size change instruction or the shape change instruction, and a second change process for changing a mode of the indices of the image of the protractor to a mode based on the received instruction; and outputting the image of the protractor in which the size or shape and the mode of the indices are changed or data of the image of the protractor.

A protractor image changing apparatus of the present disclosure includes: one or more processors; and one or more memories configured to store instructions executable by the one or more processors. The one or more processors, under control of the instructions, performs: acquiring an image of a protractor having a plurality of indices used for measurement; determining whether a size change instruction or a shape change instruction for the image of the protractor has been received; when it is determined that the size change instruction or the shape change instruction for the image of the protractor has been received, performing a first change process for changing a size or shape of the image of the protractor based on whether the received instruction is the size change instruction or the shape change instruction, and a second change process for changing a mode of the indices of the image of the protractor to a mode based on the received instruction; and outputting the image of the protractor in which the size or shape and the mode of the indices are changed or data of the image of the protractor.

A server apparatus of the present disclosure is configured to transmit a protractor image changing program to a client terminal capable of communicating with the server apparatus via a network. The client terminal performs a process based on the protractor image changing program. The process includes: acquiring an image of a protractor having a plurality of indices used for measurement; determining whether a size change instruction or a shape change instruction for the image of the protractor has been received; when it is determined that the size change instruction or the shape change instruction for the image of the protractor has been received, performing a first change process for changing a size or shape of the image of the protractor based on whether the received instruction is the size change instruction or the shape change instruction, and a second change process for changing a mode of the indices of the image of the protractor to a mode based on the received instruction; and outputting the image of the protractor in which the size or shape and the mode of the indices are changed or data of the image of the protractor.

BRIEF DESCRIPTION OF THE DRAWINGS

The components in the drawings are not necessarily to scale relative to each other.

FIG. 7 is a diagram illustrating a look-up table relating to a mode of an index;

DETAILED DESCRIPTION

An embodiment of the present invention will be described with reference to the drawings. The present embodiment relates to an application using a web, which is used in a school education place or the like. The application of the present embodiment is used particularly in mathematics education.

[Configuration of System]

Figure 1:
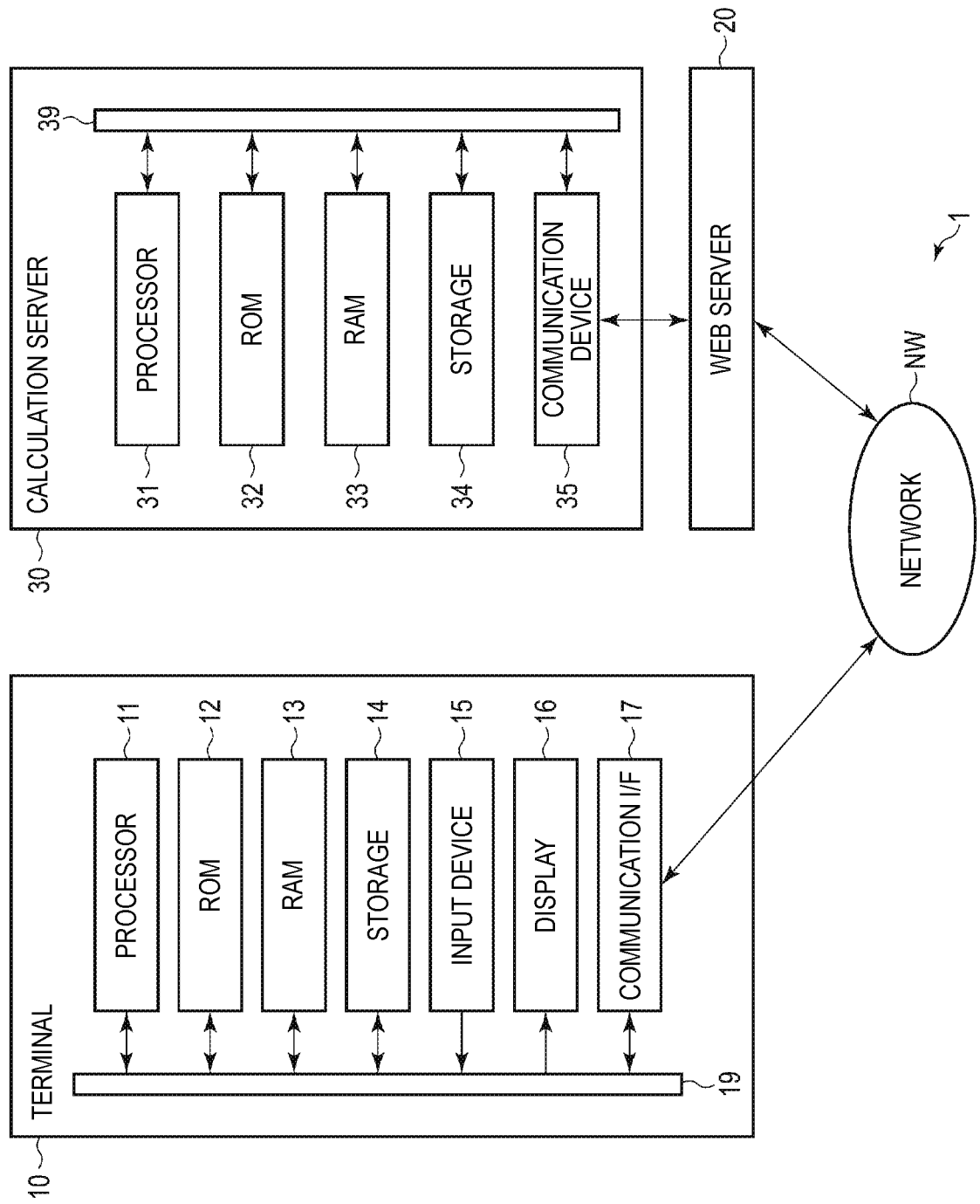
FIG. 1 is a block diagram illustrating an outline of a configuration of a system according to an embodiment.

FIG. 1 is a diagram illustrating an outline of a configuration example of a system 1 according to the present embodiment. The system 1 includes a terminal (protractor image changing apparatus) 10 as a client, a web server (server apparatus) 20, and a calculation server 30. The terminal 10 is, for example, various information terminals such as a personal computer (PC), a tablet information terminal, and a smartphone. In the terminal 10, a web browser operates. The web server 20 transmits to the terminal 10 an execution program (protractor image changing program) that operates on a web browser of the terminal 10. The terminal 10 receives the execution program and executes the execution program on a web browser operating on the terminal 10.

Although FIG. 1 illustrates one terminal 10, the number of terminals included in the system 1 may be any number. Any number of terminals may execute the web application.

As illustrated in FIG. 1, the terminal 10 includes a processor 11, a read only memory (ROM) 12, a random access memory (RAM) 13, a storage 14, and an input device 15, a display 16, and a communication interface (I/F) 17, which are connected to each other via a bus line 19.

The processor 11 performs various signal processing and the like. Various integrated circuits such as a central processing unit (CPU), an application specific integrated circuit (ASIC), a field programmable gate array (FPGA), or a graphics processing unit (GPU) may be used instead of or together with the processor 11. That is, the terminal 10 may use various processors.

A start-up program and the like are recorded in the ROM 12. The RAM 13 functions as a main storage device of the processor 11. As the RAM 13, for example, a dynamic RAM (DRAM), a static RAM (SRAM), or the like can be used. As the storage 14, for example, a hard disk drive (HDD), a solid state drive (SSD), an embedded multi media card (eMMC), or the like is used. Various pieces of information such as programs and parameters used by the processor 11 are recorded in the storage 14. The RAM 13 and the storage 14 are not limited thereto and may be replaced with various storage devices.

The input device 15 is, for example, a keyboard, a mouse, a touch panel, or the like. The display 16 is, for example, a liquid crystal display, an organic EL display, or the like. The touch panel of the input device 15 is integrated with the display 16. The communication interface 17 is used when communicating with a device outside the terminal 10. The communication interface 17 is connected to a network NW such as the Internet.

The calculation server 30 is connected to the web server 20 to be able to communicate via the network NW. On the web server 20, there is a back-end server for a web application. The web server 20 is responsible for processing necessary for realizing the web application. Behind the web server 20, there is the calculation server 30 that executes calculations of various functions. The arithmetic engine of the calculation server 30 can be accessed only from the back-end server of the web server 20 and cannot be directly accessed from outside, and the arithmetic engine is kept secret.

As illustrated in FIG. 1, the calculation server 30 is an information processing apparatus including a processor 31, a ROM 32, a RAM 33, a storage 34, and a communication device 35, which are connected to each other via a bus line 39.

The processor 31 performs various signal processing and the like. The ROM 32 records information used for the operation of the processor 31. The RAM 33 functions as a main storage device of the processor 31. Various recording media can be used for the storage 34. Various pieces of information such as programs and parameters used by the processor 31 are recorded in the storage 34.

In the present embodiment, input and display are performed using a combination of display input areas having a frame called a "pad". There are a plurality of types of pads. As will be described later, FIGS. 5 to 16 illustrating examples of screens displayed on the display 16 of the terminal 10 appropriately illustrate a geometry pad DIA1, a measuring tool information pad DIA2, and the like.

The geometry pad DIA1 is, for example, a pad on a two-dimensional xy coordinate plane. The geometry pad DIA1 displays, for example, a graph or a figure according to a mathematical expression input or a direct operation of the touch panel, an image of a measuring tool (measuring instrument), and the like. When the display of a measuring tool is instructed, the measuring tool information pad DIA2 displays information of the measuring tool. Pads that are related to each other, such as the geometry pad DIA1 and the measuring tool information pad DIA2, are displayed by being linked by a line called a string RK1.

[Operation of System]

The system 1 according to the present embodiment has many functions. Some examples will be described. Each function is realized by cooperation of the terminal 10, the web server 20, and the calculation server 30. For example, when the terminal 10 on which a web browser operates accesses the web server 20, the terminal 10 acquires a program from the web server 20. The terminal 10 executes the program on a web browser. The terminal 10 performs various calculations and displays based on the information input on the web browser by the user operating the input device 15 of the terminal 10. When the calculation by the calculation server 30 is necessary, the terminal 10 transmits information necessary for the calculation to the calculation server 30 via the web server 20. The calculation server 30 performs various calculations based on the information obtained from the terminal 10. The calculation server 30 transmits the calculation result to the terminal 10 via the web server 20. The terminal 10 displays various images on the display 16 based on the information obtained from the calculation server 30.

The operation of the terminal 10 according to the present embodiment will be described with reference to the flowcharts illustrated in FIGS. 2 to 4. In the description, the screen examples illustrated in FIGS. 5 to 16 are appropriately referred to.

According to the present application, a coordinate display input area called the geometry pad DIA1 can be displayed on the display of the terminal 10 connected to the calculation server 30 and the web server 20 via the network NW. The geometry pad DIA1 can be displayed together with an image of a measuring tool arbitrarily selected by the user along with various figure objects and graph displays of functions, and can be arbitrarily moved. The following operation describes a part of the process in which the terminal 10 executes the application in a state of being connected to the calculation server 30 and the web server 20.

Figure 2:
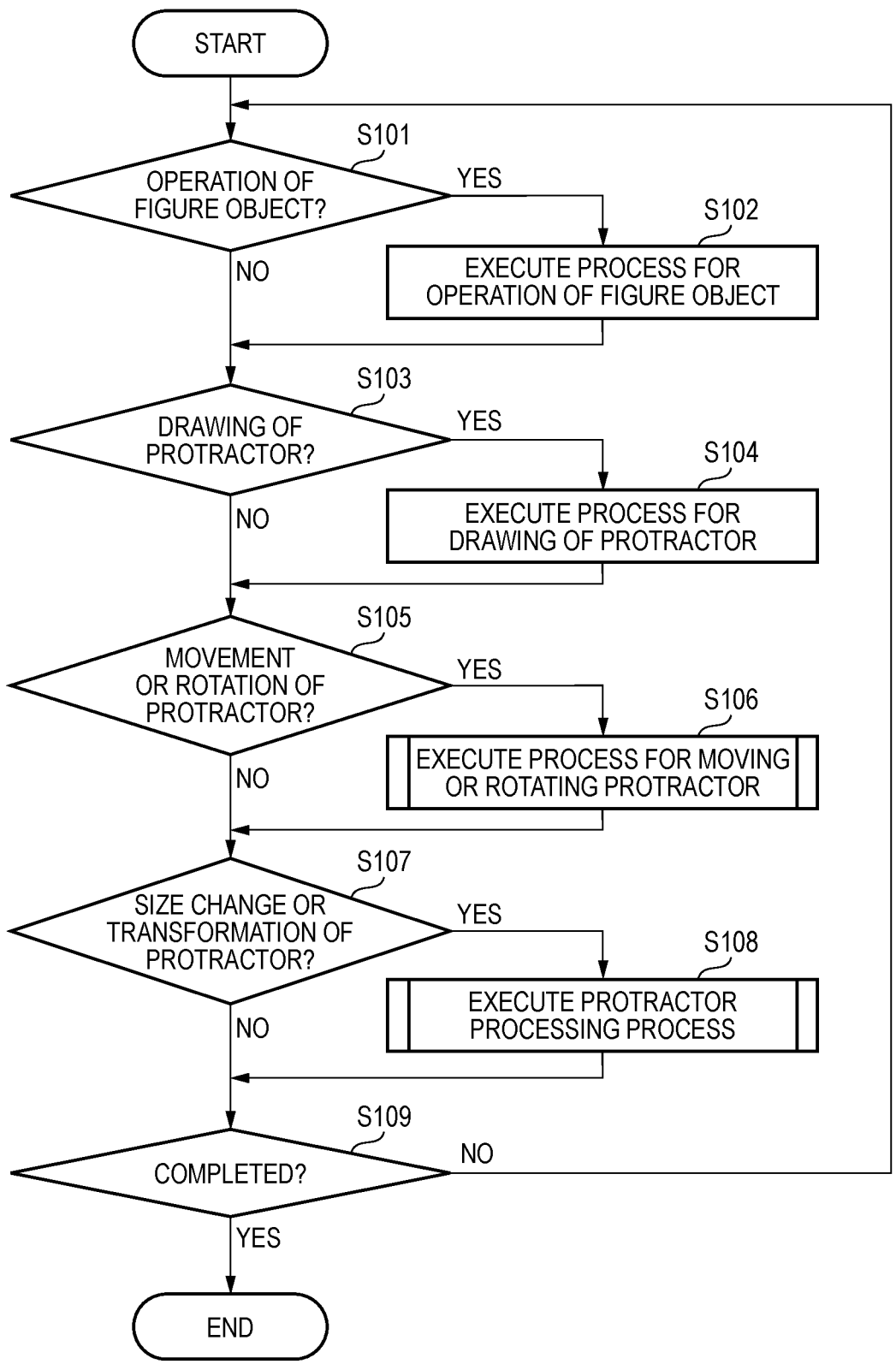
FIG. 2 is a flowchart illustrating an outline of an example of a part of an operation of a terminal according to the embodiment.

FIG. 2 is a flowchart illustrating an outline of an example of a part of the operation of the terminal 10. In the drawing, from the state where the geometry pad DIA1 is displayed on the display 16, whether the operation of a figure object is performed in the geometry pad DIA1 (step S101), whether drawing of a protractor is instructed (step S103), whether movement or rotation of the already displayed protractor is instructed (step S105), whether size change or transformation of the already displayed protractor is instructed (step S107), and whether an operation for completing the process is performed in the state where the geometry pad DIA1 is displayed on the display 16 (step S109) are repeatedly determined in order, and the process waits until any of these operations are performed.

The processes of steps S101 to S109 may be executed on the web browser of the terminal 10 by the execution program received from the web server 20.

When it is determined in step S101 that the operation of the figure object is instructed (YES in step S101), for example, tabs for various figure objects prepared below the geometry pad DIA1 are used together to execute the process corresponding to the operation of the figure object (step S102).

When the operation performed on the tab for the figure object is, for example, drawing of a sine wave curve, the processing may be transferred to the calculation server 30 side.

The instruction to draw a protractor in step S103 is determined based on whether an operation has been performed on a protractor tab TB11 that is an icon of the protractor attached to and displayed by the geometry pad DIA1.

When the protractor tab TB11 is operated, it is determined that there is an instruction to draw a protractor (YES in step S103), and a process for drawing a protractor is executed (step S104). Thus, a protractor image PT is obtained.

Figure 5:
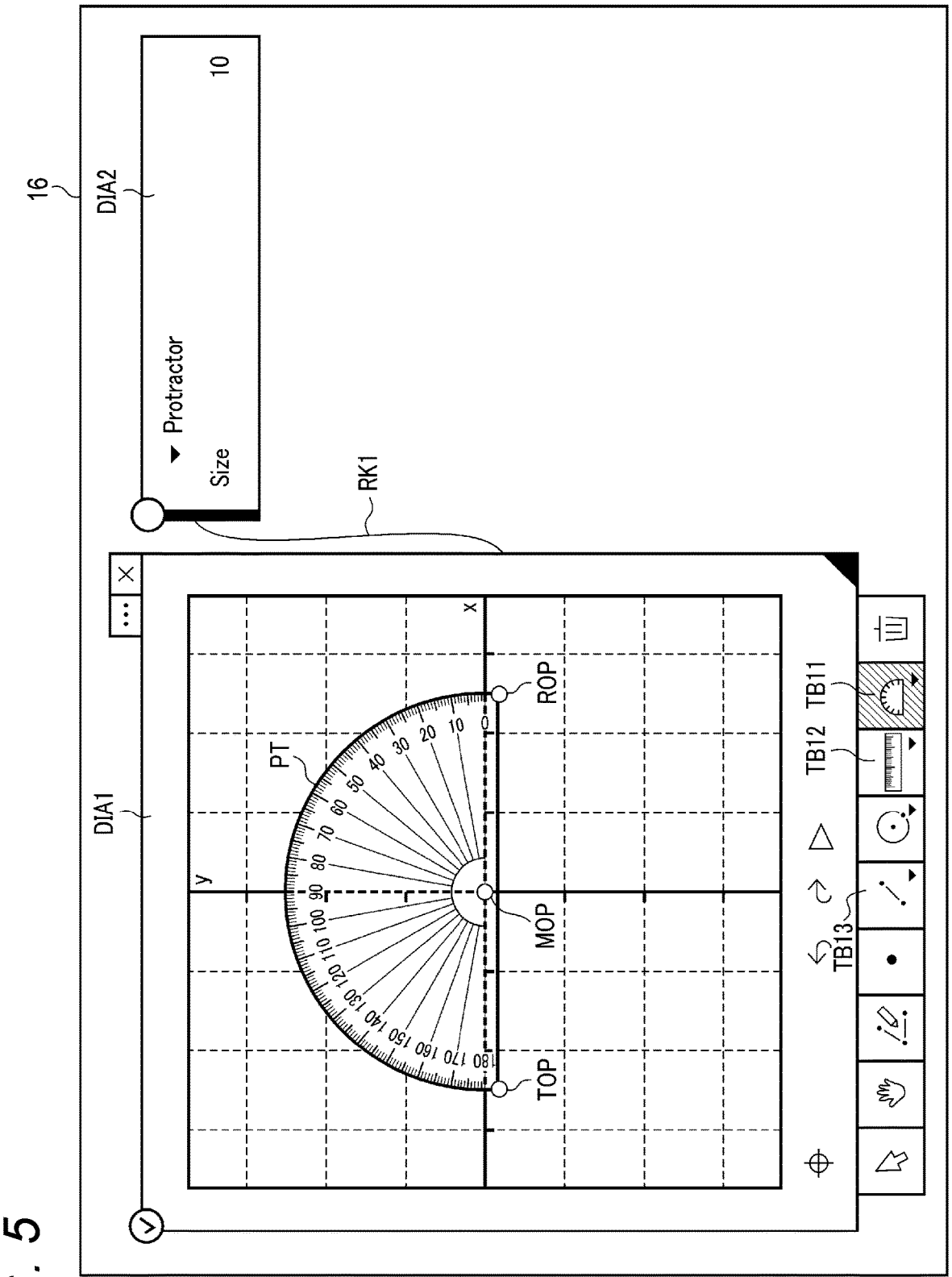
FIG. 5 is a diagram illustrating a state where a protractor image PT is displayed on a geometry pad DIA1 according to the embodiment.

FIG. 5 illustrates a state where the protractor tab TB11 attached and displayed below the geometry pad DIA1, which is displayed on the display 16 as a first display input area, is operated, and a substantially semicircular protractor image (first image) PT is displayed, for example, at the center position of the origin of the graph in the geometry pad DIA1.

The protractor image PT is an image having a shape in which a rectangular marginal edge elongated in the diameter direction is provided with a slight width in the width direction orthogonal to the diameter portion between 0° and 180°, in addition to an image of the semicircular protractor capable of measuring an angle from 0° to 180° in the counterclockwise direction. The diameter portion and the marginal portion function as an operating unit for the protractor image PT. The center point position of the protractor is set as a moving operation point (second image) MOP so that a part of the range overlaps, and the lower right end point of the narrow rectangular marginal portion, that is, the circumferential end near the 0° side is set as a rotating operation point (second image) ROP, the lower left end point of the narrow rectangular portion, that is, a circumferential end near the 180° side is set a transforming operation point (second image) TOP, and each point is displayed with a symbol "O" added to accept (e.g., to validate) an operation.

The measuring tool information pad DIA2 is displayed as a second display input area on the right side of the geometry pad DIA1. The measuring tool information pad DIA2 represents that the measuring tool is a protractor and that the size of the protractor image PT displayed at this time is "10". Then, the fact that the geometry pad DIA1 and the measuring tool information pad DIA2 are related to each other is displayed by being linked by the line called as the string RK1 using a spline curve.

At the time of the display, what was operated immediately before was the protractor tab TB11 on the geometry pad DIA1 side. Therefore, a checkmark representing that the object is to be operated is placed in the symbol "0" representing the status flag at the upper left corner of the geometry pad DIA1. On the other hand, in the measuring tool information pad DIA2, the status flag at the upper left corner is a white circle representing that the object is not an operation target at that time.

Figure 6:
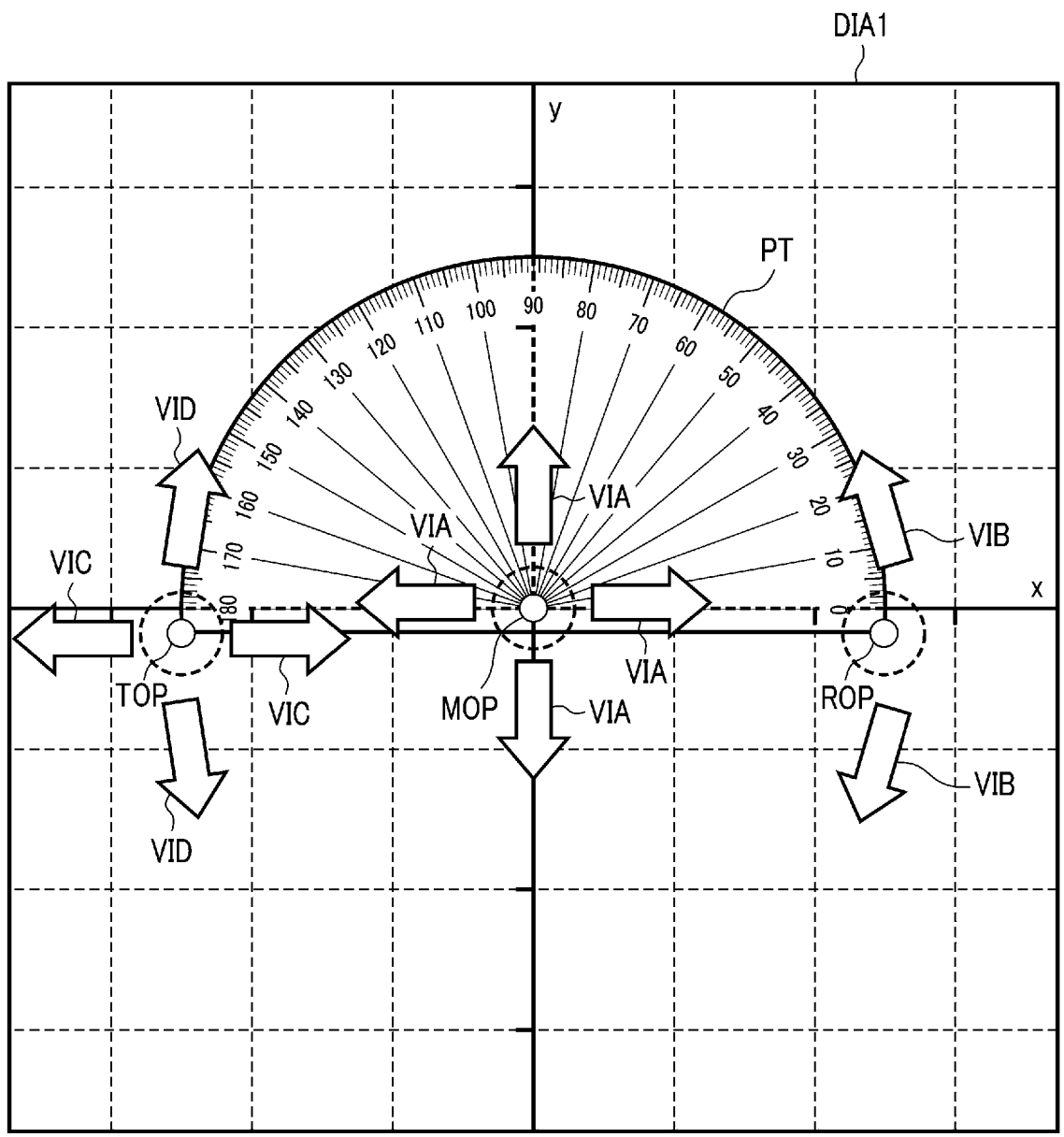
FIG. 6 is a diagram illustrating functions of operation points of a protractor image according to the embodiment.

FIG. 6 is a diagram illustrating the function of each operation point on the protractor image PT displayed on the geometry pad DIA1. The moving operation point MOP at the center point position of the protractor image PT is an operation point for moving the protractor image PT in parallel while maintaining the relative angle of the protractor image PT with respect to the geometry pad DIA1, as represented by an arrow VIA in the drawing.

On the other hand, the rotating operation point ROP located at the end near the 0° position is an operation point for rotating and moving the protractor image PT according to the operation (rotation instruction) represented by an arrow VIB in the drawing according to the circumferential direction of the protractor image PT.

The transforming operation point TOP located at the end near the 180° position is an operation point for changing the size of the protractor image PT centered on the center point position according to the operation represented by an arrow VIC in the drawing in the radial direction of the protractor image PT, and an operation point for transformation to change the measurement range of the protractor image PT according to the operation (measurement range change instruction, shape change instruction) represented by an arrow VID in the drawing in the circumferential direction of the protractor image PT. Both the rotation instruction and the measurement range change instruction are operations in the circumferential direction of the protractor image PT. However, since the rotating operation point ROP and the transforming operation point TOP are arranged in different areas in the protractor image PT, the user can execute the rotation instruction and the measurement range change instruction with a clear distinction from each other.

Regarding the operation at any of the operation points, the operation to the moving operation point MOP, the rotating operation point ROP, and the transforming operation point TOP can be received by the drag operation with respect to the pointer position with the mouse of the input device 15 or the direct slide operation on the touch panel. On the other hand, even when an operation is performed on an area that overlaps the protractor image PT but does not overlap the moving operation point MOP, the rotating operation point ROP, or the transforming operation point TOP, the protractor image PT is not moved or transformed.

When it is determined in step S105 of FIG. 2 that the movement or rotation of the protractor image PT is instructed (YES in step S105), the process for moving or rotating the protractor corresponding to the operation is performed (step S106). The moving or rotating process of the protractor is realized by, without the terminal 10 communicating with the calculation server 30, creating an image corresponding to the operation for the moving operation point MOP or the rotating operation point ROP of the protractor tab TB11 of the geometry pad DIA1 based on a program executed on the web browser, and displaying the created image on the display 16.

Figure 3:
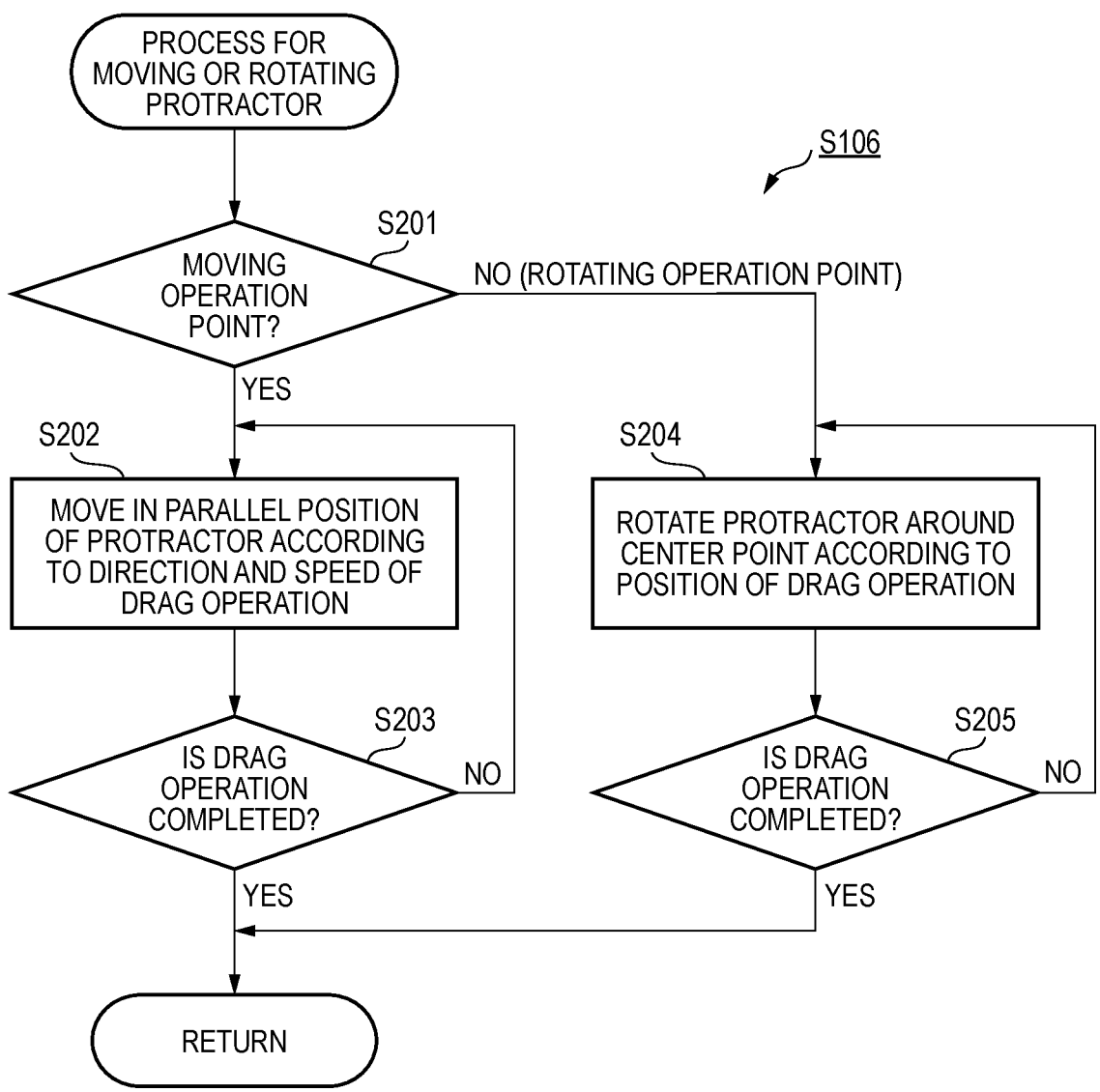
FIG. 3 is a flowchart of a subroutine illustrating detailed contents of a moving process of a protractor according to the embodiment.

FIG. 3 is a subroutine illustrating detailed contents of the moving process of the protractor in step S106. At the beginning of the process, the terminal 10 determines what is being operated is the moving operation point MOP (step S201).

When it is determined that the operation is for the moving operation point MOP (YES in step S201), the terminal 10 creates display data of the image in which the position of the protractor image PT in the coordinate plane is moved in parallel according to the speed and direction of the drag operation (or the slide operation) (step S202).

The terminal 10 determines whether the drag operation (or the slide operation) to the moving operation point MOP has been completed (step S203). When it is determined that the drag operation (or the slide operation) has not been completed (NO in step S203), the process from step S202 is further executed, and the process for moving the position of the protractor image PT displayed in the geometry pad DIA1 in parallel is continued.

Then, when it is determined that the drag operation (or the slide operation) to the moving operation point MOP has been completed (YES in step S203), the process in FIG. 3 ends, and the process returns to the process in FIG. 2 and waits for another instruction.

In step S201, when it is determined that the operation is not for the moving operation point MOP (NO in step S201), since the operation has been performed on the rotating operation point ROP, the terminal 10 fixes the center point position of the protractor image PT in the coordinate plane according to the position of the drag operation (or slide operation), and creates display data of an image obtained by rotating and moving the protractor image PT around the center point position (step S204).

The terminal 10 determines whether the drag operation (or the slide operation) to the rotating operation point ROP has been completed (step S205), and when it is determined that the drag operation (or the slide operation) has not been completed (NO in step S205), the process from step S204 is further executed, and the process for rotating and moving the position of the protractor image PT displayed in the geometry pad DIA1 based on the center point position is continued.

When it is determined that the drag operation (or the slide operation) to the rotating operation point ROP has been completed (YES in step S205), the process in FIG. 3 ends, and the process returns to the process in FIG. 2 and waits for another instruction.

In step S201, it may be determined whether the operation to the operation point is for the rotating operation point ROP. In this case, when it is determined that the operation is for the rotating operation point ROP, the process of step S204 is performed. When it is determined that the operation is not for the rotating operation point ROP, the process of step S202 is performed.

When it is determined in step S107 of FIG. 2 that a size change or transformation of the already displayed protractor is instructed (YES in step S107), a processing process is performed with respect to the size change or transformation of the protractor corresponding to the operation (step S108).

The processing process related to the size change or transformation of the protractor is executed in response to an instruction to the transforming operation point TOP of the geometry pad DIA1. That is, with respect to the transforming operation point TOP of the protractor image PT, when an operation for changing the size of the protractor image PT centered the center point position is performed according to the operation in the direction represented by the arrow VIC in FIG. 6 in the radial direction of the protractor image PT, or when an operation for the transformation to change the measurement range of the protractor image PT is performed according to the operation in the direction represented by the arrow VID in FIG. 6 in the circumferential direction of the protractor image PT, the processing process corresponding to the operation is performed.

Figure 4:
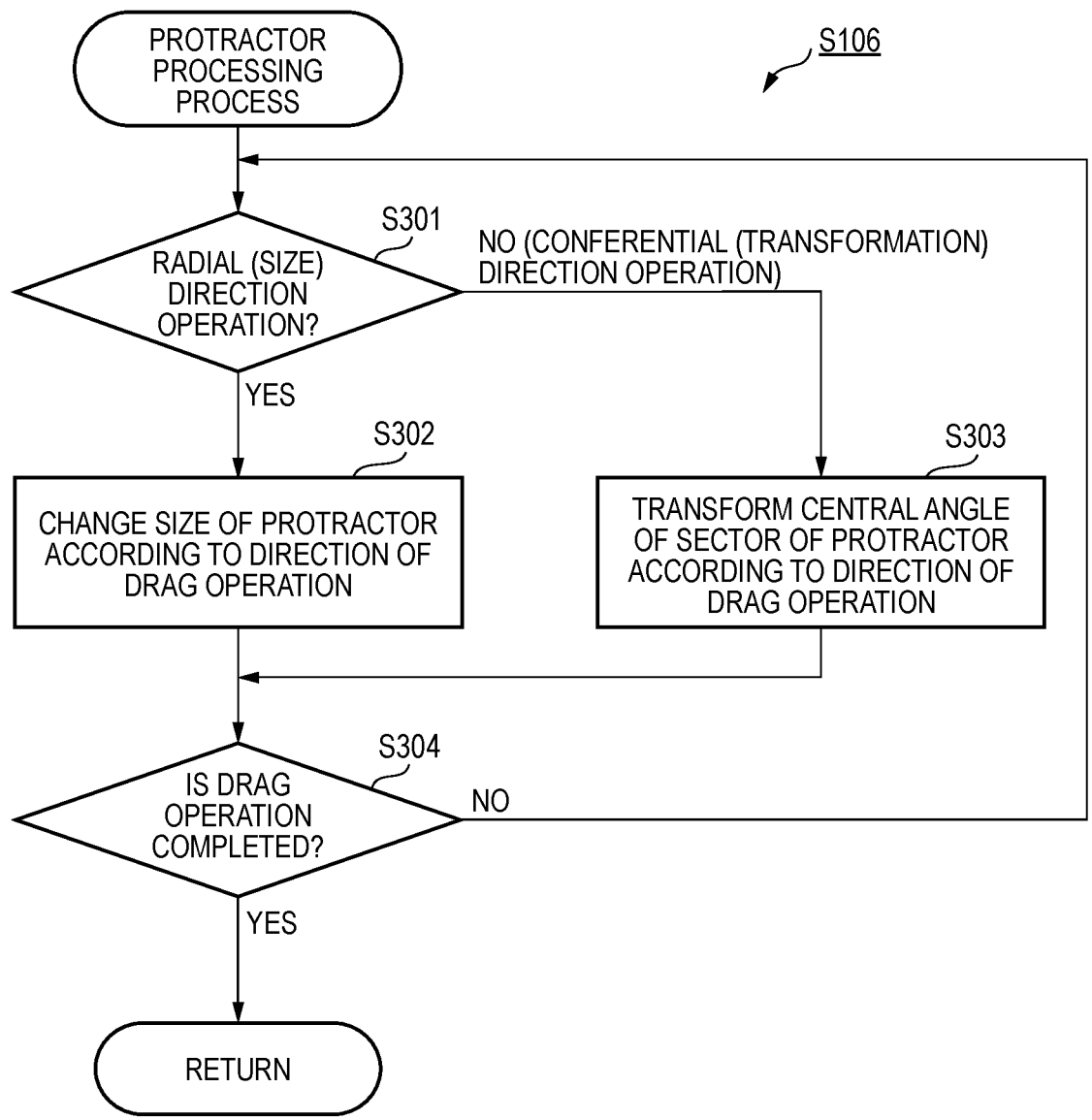
FIG. 4 is a flowchart of a subroutine illustrating detailed contents of a size change process of the protractor.

FIG. 4 is a subroutine illustrating detailed contents of the processing process (shape change process) related to the size change process or transformation of the protractor in step S108. At the beginning of the process, the terminal 10 determines whether the operation to the transforming operation point TOP is in the radial direction of the protractor image PT represented by the arrow VIC in FIG. 6 and is an operation for changing the size of the protractor image PT (step S301).

When it is determined that the operation to the transforming operation point TOP is in the radial direction of the protractor image PT and is an operation for changing the size of the protractor image PT (YES in step S301), the terminal 10 receives the operation amount of the transforming operation point TOP, and creates an image of the protractor image PT newly enlarged or reduced according to the received operation amount.

When the font size of the label of the scale width and the angle numerical value is kept before and after the change of the size of the protractor image PT, the scale line can become black or the label font can become too large when the size is reduced. Conversely, when the size is increased, the scale width can be too large or the label font can remain relatively small, making measurement difficult.

Therefore, regarding the protractor image PT at the new size, the relationship between the new size range and the scale and the label font of the angle numerical value in the protractor image PT is set in advance using, for example, a look-up table, and the terminal 10 may create the protractor image PT with reference to a plurality of indices (the scale and the label font of the angle numerical value, etc.) used for measurement in the protractor image PT in which the change in size is specified.

Figure 8:
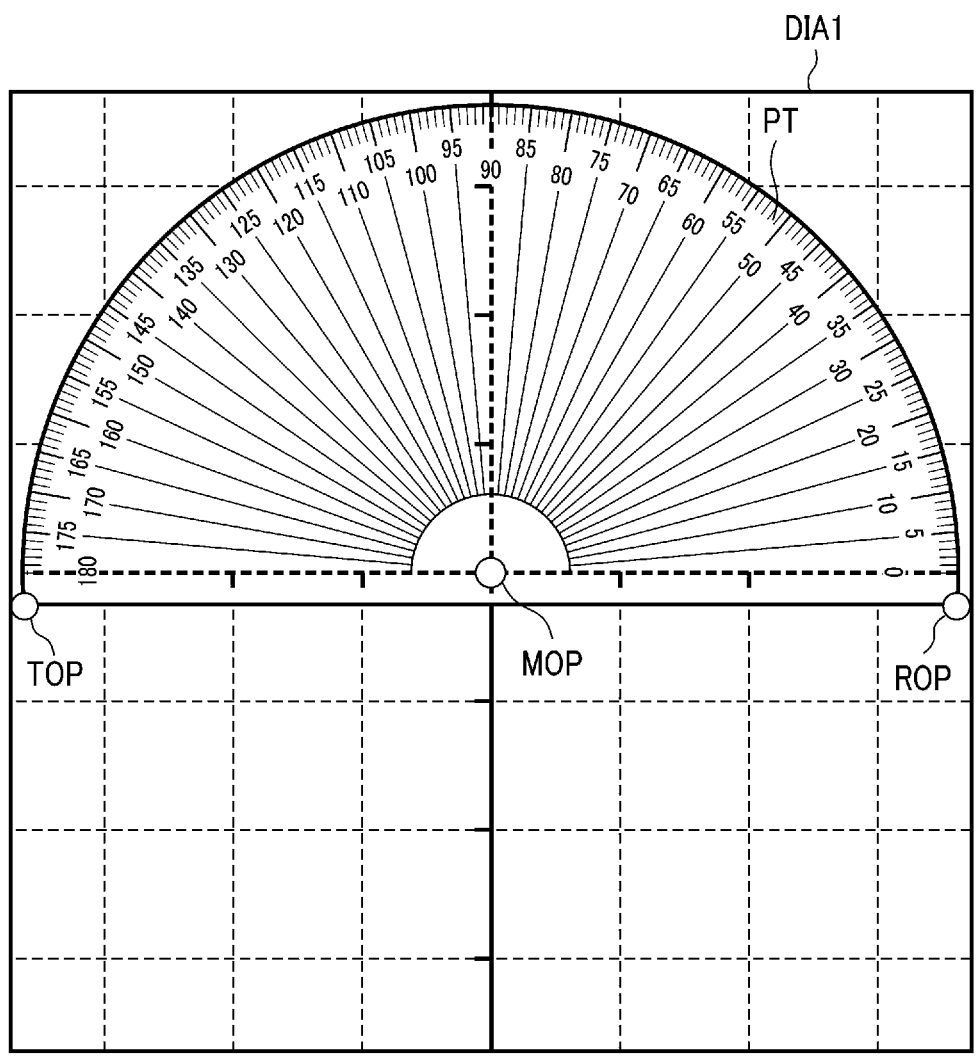
FIG. 8 is a diagram illustrating a state where the protractor image is enlarged to a substantially maximum size according to the embodiment.
Figure 9:
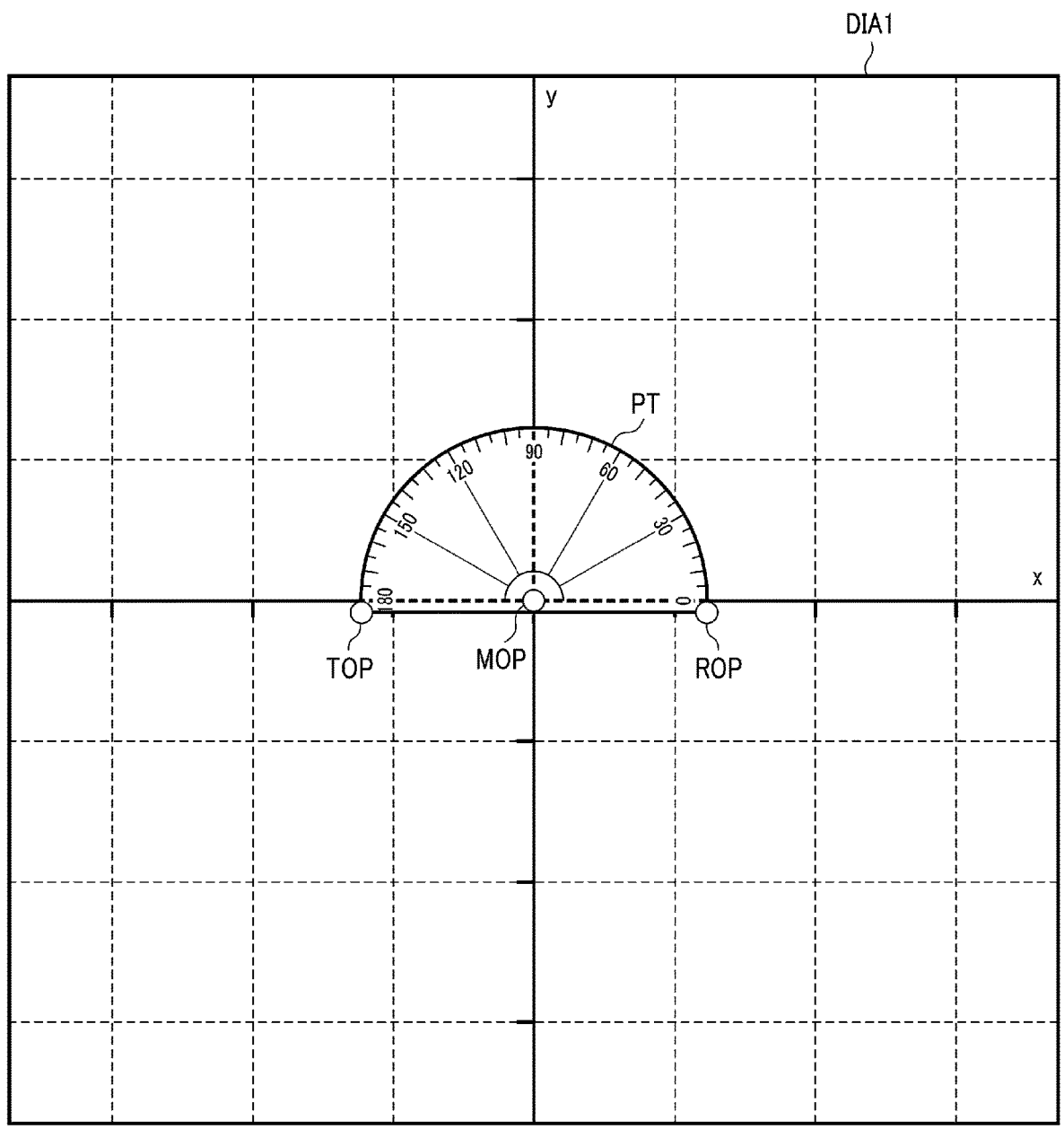
FIG. 9 is a diagram illustrating a state where the protractor image is reduced.

FIG. 7 illustrates an example of a look-up table relating to the mode of the index. According to such a look-up table, when the magnification specified by the size change instruction is 0.75 or more and less than 1.25, as illustrated in FIG. 5, the protractor image PT is created in which the large scales are engraved every 10°, the medium scales are engraved every 5°, the small scales are engraved every 1°, and the numerical value labels are engraved every 10°. When the magnification specified by the size change instruction is 1.25 or more, as illustrated in FIG. 8, a protractor image PT is created in which the major scales are engraved every 10°, the medium scales are engraved every 5°, the small scales are engraved every 1°, and the numerical value labels are engraved every 5°. When the magnification specified by the size change instruction is smaller than 0.75, as illustrated in FIG. 9, a protractor image PT is created in which the large scales are engraved every 10°, the medium scales are engraved every 5°, the small scales are not displayed, and the numerical value labels are engraved every 30°.

As described above, the change of the mode of the index according to the size change is different from the fact that the size of the storage, which is the index, and the font size of the numerical number label are enlarged or reduced at the same magnification according to the magnification when the image is enlarged or reduced.

The terminal 10 rewrites the created protractor image PT having the new size based on the center point instead of the original protractor image PT to create new display data (step S302), and causes the display 16 to newly display the created protractor image PT.

In step S301, when it is determined that the operation to the transforming operation point TOP is performed not in the radial direction of the protractor image PT but in the circumferential direction of the protractor image PT represented by the arrow VID in FIG. 6, and is not an operation for changing the size but an operation for changing the measurement range of the protractor image PT (NO in step S301), the terminal 10 receives the operation amount of the transforming operation point TOP, and creates an image of the protractor image PT newly transformed to change the measurement range (central angle of a sector) according to the received operation amount.

The terminal 10 rewrites the created transformed protractor image PT based on the center point instead of the original protractor image PT to create new display data (step S303), and causes the display 16 to newly display the created protractor image PT. Here, along with the shape change process of the protractor image PT, the shape and the mode of the index of the protractor image PT is changed without step according to the size of the central angle specified by the shape change instruction (a numerical value representing the feature amount of the shape of the protractor image PT).

After the process in step S302 or S303, the terminal 10 further determines whether the drag operation (or the slide operation) to the transforming operation point TOP has been completed (step S304). When it is determined that the drag operation (or the slide operation) to the transforming operation point TOP has not been completed (NO in step S304), the process returns to the process from step S301 again, and the process according to the operation to the transforming operation point TOP is continued.

Then, when it is determined that the drag operation (or the slide operation) to the transforming operation point TOP has been completed (YES in step S304), the process in FIG. 4 ends, and the process returns to the process in FIG. 2 and waits for another instruction.

In step S301, it may be determined whether the operation to the transforming operation point TOP is in the circumferential direction of the protractor image PT represented by the arrow VID in FIG. 6 and is an operation for transforming the protractor image PT. In this case, when it is determined that the operation is in the circumferential direction of the protractor image PT represented by the arrow VID and is an operation for transforming the protractor image PT, the process in step S303 is performed. When it is determined that the operation is not in the circumferential direction of the protractor image PT represented by the arrow VID, and is not an operation for transforming the protractor image PT, the process in step S302 is performed.

FIGS. 8 and 9 illustrate a case where the size is changed by an instruction operation along the radial direction of the transforming operation point TOP in the second image of the protractor image PT.

FIG. 7 illustrates a state where the protractor image PT fitting within the geometry pad DIA1 is enlarged up to a substantially maximum size while maintaining the relative angle with respect to the geometry pad DIA1 according to an operation (enlargement instruction, size change instruction) for moving the transforming operation point TOP outward along the radial direction of the protractor image PT (first change process). In FIG. 5, the angle numerical value is expressed in units of "10°" in the protractor image PT, but in FIG. 8, a numerical value label is added to express the numerical value in units of "5°" (second change process). That is, when the size of the image of the protractor image PT is increased, by adding a scale and a label of an angle numerical value to make the image finer, it is possible to perform a more detailed angle measurement with the enlargement of the size.

FIG. 9 illustrates a state where the size of the protractor image PT is substantially reduced to half according to an operation (reduction instruction, size change instruction) for moving the transforming operation point TOP inward along the radial direction of the protractor image PT in the geometry pad DIA1 (first change process). In FIG. 9, by leaving a medium scale for every "5°" and a large scale for every "10°" and deleting a small scale for every "1°", the minimum measurement scale at the outermost circumference is set in units of "5°", the numerical value label is deleted and the numerical notation is changed to be displayed in units of "30°" (second change process). In other words, when the size of the image of the protractor image PT is reduced, the scale of the protractor image PT is avoided from being uselessly detailed along with the reduction of the size and the measurement is taken as long as rough measurement of the angle is possible by deleting the scale and the label of the angle numerical value to make the scale coarser.

Here, along with the size change process of the protractor image PT, the mode of the index is changed stepwise according to the magnification specified by the size change instruction, but the size of the protractor image PT is changed without step according to the magnification specified by the size change instruction. Specifically, assuming that the step value of the step is 0.5 times, when the magnification specified by the size change instruction crosses 0.5 times, 1.5 times, 2.0 times, and the like, the mode of the index changes. Therefore, when the magnification is 0.5 times or more and less than 1.5 times, the mode of the index is the same regardless of the specified magnification. When the specified magnification is less than 0.5 times, the mode of the index is the same regardless of the specified magnification, but is different from the mode of the index when the specified magnification is 0.5 times or more and less than 1.5 times. The same applies when the specified magnification is 1.5 times or more and less than 2.0 times or 2.0 times or more. On the other hand, since the size of the protractor image PT changes without step according to the specified magnification, for example, when the magnification is 0.8 times or 1.2 times, the mode of the index is not changed but the size of the image PT is changed to a size corresponding to each magnification.

When it is determined that an operation for completing the process has been performed in step S109 of FIG. 2 (YES in step S109), the application between the terminal 10, the web server 20, and the calculation server 30 illustrated in the process of FIG. 2 ends.

Figure 10A:
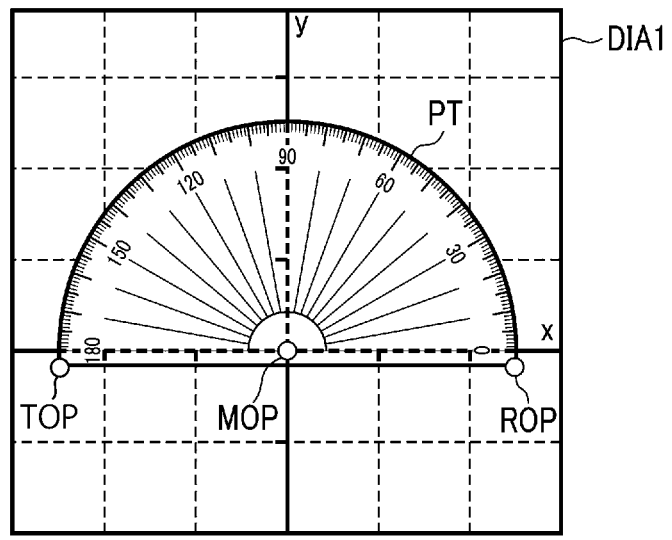
FIG. 10A is a diagram illustrating a state where the protractor image and a figure object are mixed in a geometry pad according to the embodiment.
Figure 10B:
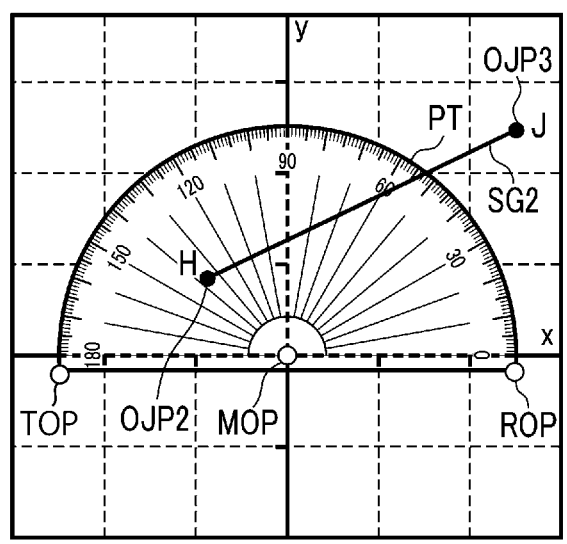
FIG. 10B is a diagram illustrating a state where the protractor image and a figure object are mixed in a geometry pad according to the embodiment.
Figure 10C:
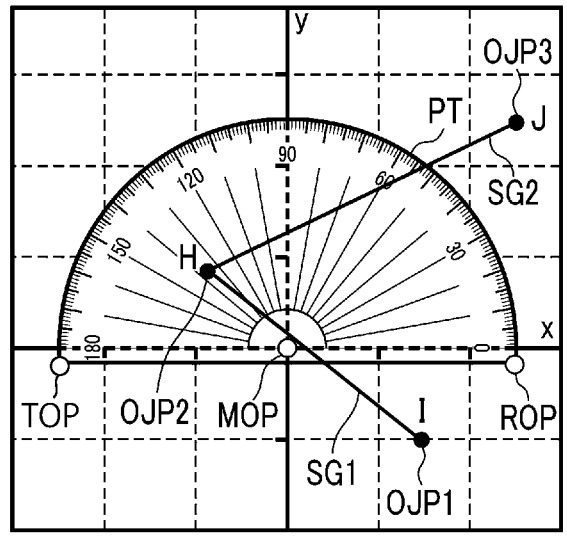
FIG. 10C is a diagram illustrating a state where the protractor image and a figure object are mixed in a geometry pad according to the embodiment.

FIGS. 10A to 10C illustrate a transition of a process in which a figure object is created and drawn from a state where the protractor image PT is already displayed on the geometry pad DIA1 on the display 16.

FIG. 10A illustrates a state where only the protractor image PT is displayed in the coordinates of the geometry pad DIA1 in response to an operation on the protractor tab TB11 below the geometry pad DIA1 as in FIG. 5.

In FIG. 10B, after operating a line segment tab TB13 below the geometry pad DIA1 displayed in FIG. 5, first, a point "H" as a figure object is designated by the position of OJP2, and then the operation of designating a point "J" OJP3 position is continued. As illustrated in FIG. 10B, a state where the point "H" OJP2 and the point "J" OJP3, and a line segment SG2 connecting these points "H" OJP2 and "J" OJP3 are drawn as a figure object is illustrated.

In the protractor image PT, except for the operation points (MOP and ROP), since the figure object image is set to be positioned higher in the layer structure, the figure object is preferentially displayed on the protractor image PT.

FIG. 10C illustrates a state where a point "I" OJP1, and a line segment SG1 connecting the points "I" OJP1 and "H" OJP2 is additionally drawn.

In this case, since the figure object is set to be positioned higher in the layer structure than the protractor image PT, the figure object is displayed with priority on the protractor image PT.

In FIGS. 10B and 10C, by placing and clicking the pointer PO to overlap the point "H" OJP2, the point "H" OJP2 is selected and then, dragged as it is, thereby moving the position of the point "H" OJP2 in the geometry pad DIA1. As described above, when the figure object overlaps the protractor image PT, the operation on the overlapping display area is accepted as the operation on the figure object. Stated differently, when the operation of the shape change instruction is performed on a position that overlaps the second image, the operation is validated. When the operation of the shape change instruction is performed on a position that overlaps the first image and does not overlap the second image, the operation is invalidated.

Next, with reference to FIGS. 11A to 13, an operation example for measurement involving the transformation of the protractor image PT (change in measurement range) will be described.

Figure 11A:
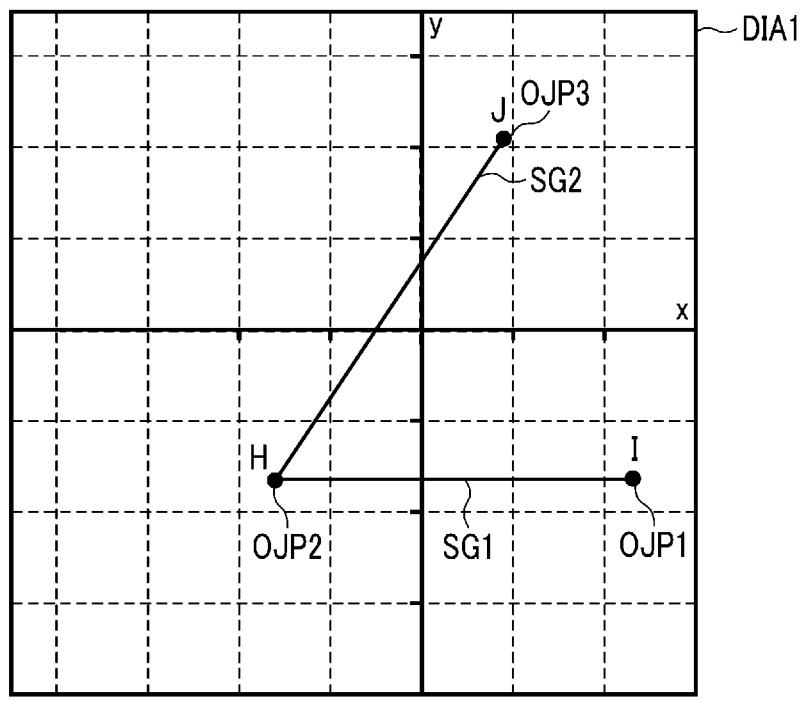
FIG. 11A is a diagram illustrating an operation example for measurement involving transformation of the protractor image.

FIG. 11A illustrates a state where a figure object is already displayed on the geometry pad DIA1 of the display device 16. That is, FIG. 11A illustrates a state where the point "I" OJP1, the point "H" OJP2, the point "J" OJP3, the line segment SG1 connecting the points "I" OJP1 and "H" OJP2, and the line segment SG2 connecting the points "H" OJP2 and "J" OJP3, as a figure object, are drawn. By the following operation, the angle of the outer angle of ∠IHJ of the figure object is measured using the protractor image PT.

Figure 11B:
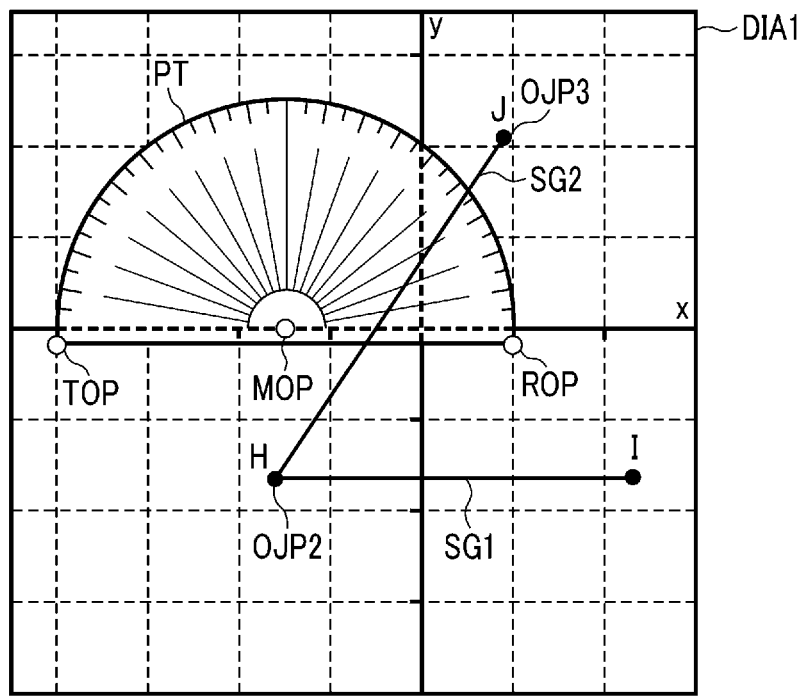
FIG. 11B is a diagram illustrating an operation example for measurement involving transformation of the protractor image.

FIG. 11B illustrates a state where the protractor tab TB11 below the geometry pad DIA1 is operated from the display state of FIG. 11A to add and display the protractor image PT in the coordinates of the geometry pad DIA1.

In the present embodiment, in the order of "protractor image (excluding operation points)", "figure object", and "operation points (of the protractor image)", it is assumed that the latter is set so that the display and operation priorities are higher. When arranging the elements at positions overlapping each other, control is performed so that the element with the highest priority is displayed and becomes the operation target.

In FIG. 11B, a part of the line segment SG2 connecting the points "H" OJP2 and "J" OJP3, which is the figure object, overlaps the protractor image PT. However, since the figure object image has a higher priority except for the operation points (MOP, ROP and TOP), the line segment SG2 is displayed without being overlaid on the protractor image PT.

Figure 12A:
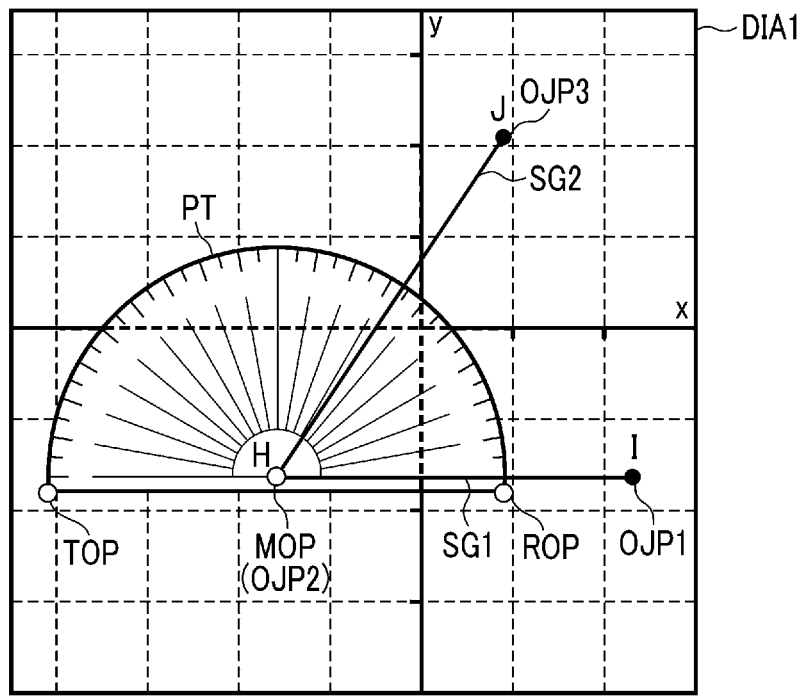
FIG. 12A is a diagram illustrating an operation example for measurement involving the transformation of the protractor image.

FIG. 12A illustrates a state where the moving operation point MOP, which is the center point position of the protractor image PT, is moved in parallel until the moving operation point MOP overlaps the point "H" OJP2, from the display state of FIG. 11B. The moving operation point MOP has a higher priority than the figure object and is displayed in front of the point "H" OJP2, which is the figure object. Therefore, even when the figure object and the protractor image PT overlap, the moving operation of the protractor image PT is easy to be performed.

Figure 12B:
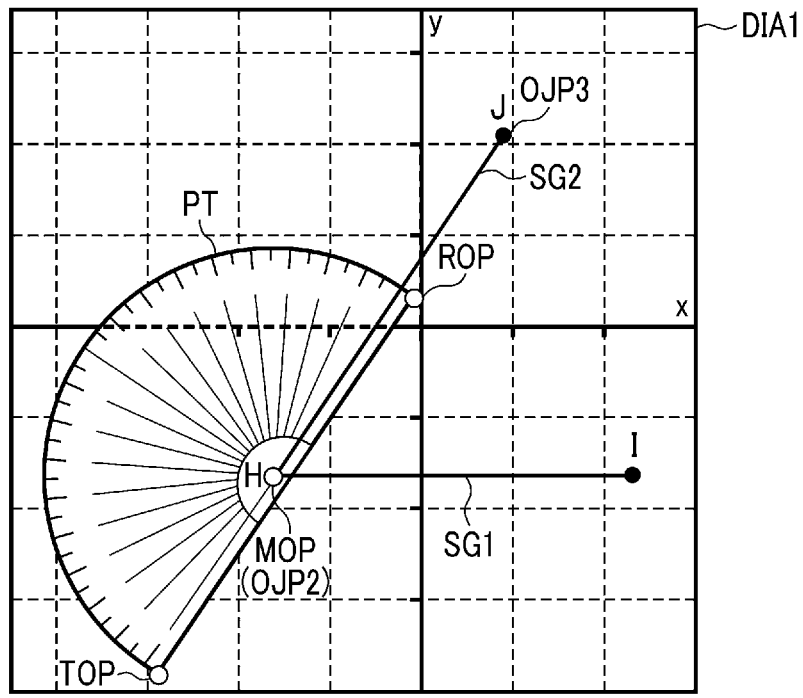
FIG. 12B is a diagram illustrating an operation example for measurement involving the transformation of the protractor image.

FIG. 12B illustrates a state where the rotating operation point ROP of the protractor image PT is rotated from the display state of FIG. 12A so that the 0° line of the protractor image PT overlaps the line segment SG2.

Figure 13:
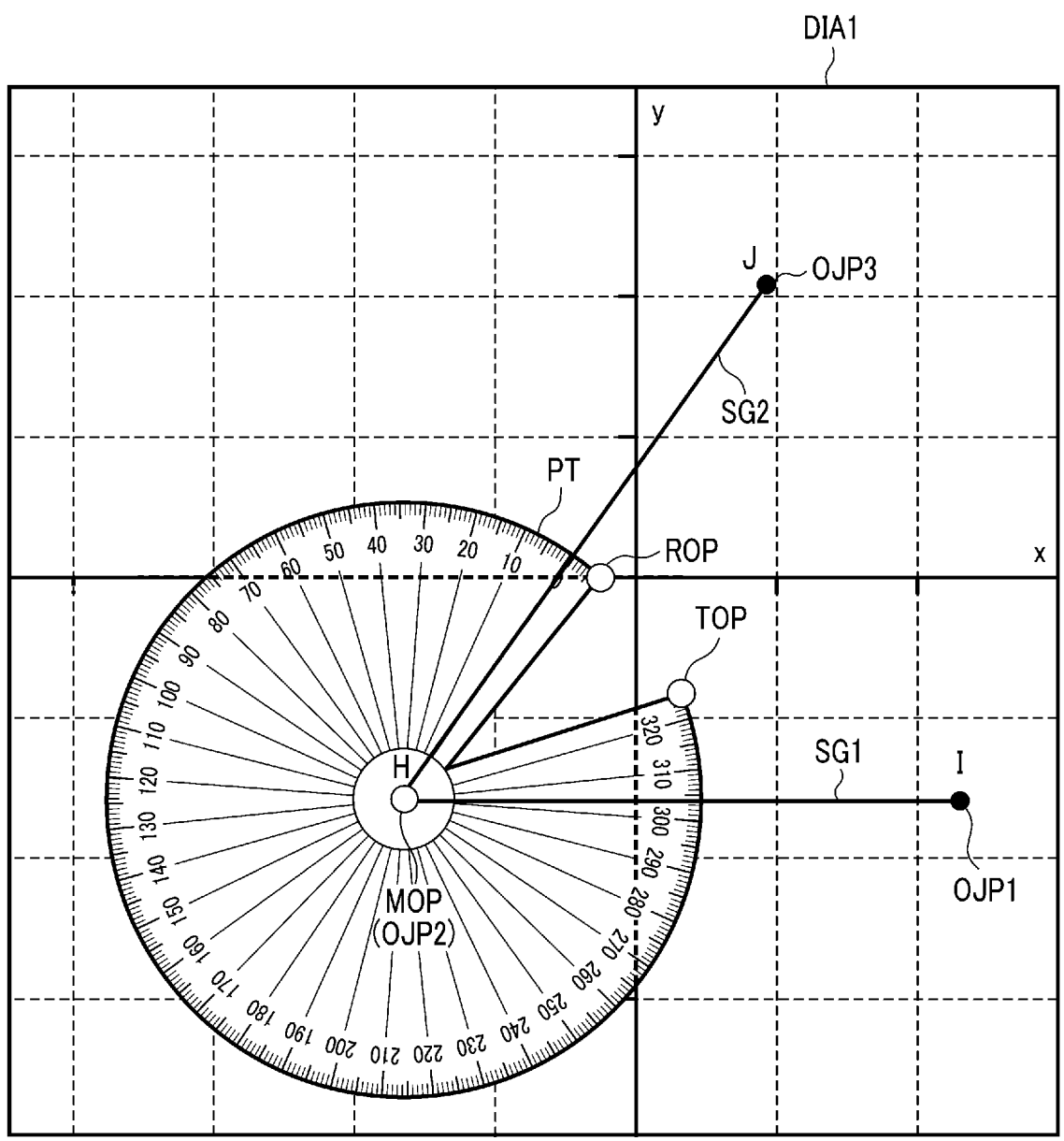
FIG. 13 is a diagram illustrating an operation example for measurement involving the transformation of the protractor image.

FIG. 13 illustrates the display state when the protractor image PT is transformed to exceed the line segment SG1, which is the figure object, by performing the drag operation on the transforming operation point TOP of the protractor image PT from the display state of FIG. 12B along the circumferential direction represented by the arrow VID in FIG. 6 so that the central angle of the sector of the protractor image PT increases. The drag operation performed on the transforming operation point TOP of the protractor image PT along the circumferential direction represented by the arrow VID in FIG. 6 so that the central angle of the sector of the protractor image PT increases or decreases is referred to as a "measurement range change instruction". As described above, the change in the mode of the index accompanying the shape change means not only that the size of the central angle of the protractor image PT is changed, but also when a storage and numerical value label serving as an index is added to a spread portion of the protractor image PT according to the shape change, or the protractor image PT becomes smaller so that a part of the image is not displayed, the storage and numerical value label which are indices displayed in the non-display portion becomes non-display.

Here, since the central angle of the physical protractor is fixed, for example, in the case of a physical protractor having a central angle of 180°, an angle exceeding 180° cannot be measured. According to the protractor image PT of the present embodiment, the central angle thereof can be increased or decreased. Therefore, even for the angle exceeding the initial value (here, 180°) of the central angle of the protractor image PT, a measurement can be easily made. For example, in the case of a physical protractor having a central angle of 360°, there is a disadvantage that it is difficult to see a figure overlapping the protractor. However, according to the protractor image PT of the present embodiment, the central angle thereof can be increased or decreased, and the shape of the protractor image PT can be changed to the magnitude of the central angle corresponding to the angle to be measured. Therefore, the overlapping area between the protractor image PT and the figure other than the measurement target portion (corner) can be reduced. As a result, it is possible to prevent the figure in the portion overlapping the protractor image PT from being difficult to see.

Here, a part of the line segment SG1 connecting the points "I" OJP1 and "H" OJP2, which is the figure object, overlaps with the protractor image PT. However, since the figure object image has a higher priority except for the operation points (MOP, ROP and TOP), the line segment SG1 is displayed on the front side of the protractor image PT without being hidden.

As a result, since the line segment SG1 is displayed with priority on the scale of the protractor image PT, it is possible to accurately measure the angle of the outer angle of ∠IHJ of the figure object using the protractor image PT.

As described above, in the present embodiment, the processor 11 mutually exclusively receives a measurement range change instruction, which will be described later, and a first measuring instrument size change instruction or a second measuring instrument size change instruction. Accordingly, it is easy to perform only one of the operation of changing the size of the protractor image PT and the operation of changing the measurement range of the protractor image PT. The processor 11 may allow simultaneous reception of the measurement range change instruction described later and the first measuring instrument size change instruction or the second measuring instrument size change instruction. In that case, when both the measurement range change instruction and the first measuring instrument size change instruction or the second measuring instrument size change instruction are to be executed, the number of operations can be reduced as compared to a case where each operation is exclusively received.

Figure 14A:
FIG. 14A is a diagram illustrating settings of a priority between the operation point and the figure object.

Next, the setting of the priorities of the operation points (MOP, ROP and TOP) and the figure object will be described with reference to FIGS. 14A to 14E. FIGS. 14A to 14E are diagrams illustrating display modes according to the positional relationship of the moving operation point MOP, which is one of the operation points of the protractor image PT, a point OJP in the figure object, and the pointer PO on the screen based on a mouse operation of the input device 15 displayed in the geometry pad DIA1. FIG. 14A exemplifies a case where the pointer PO is at substantially the same position while being sufficiently separated from both the moving operation point MOP and the point OJP.

Figure 14B:
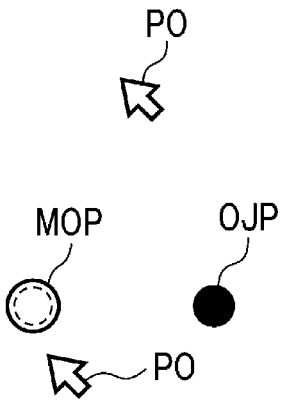
FIG. 14B is a diagram illustrating settings of a priority between the operation point and the figure object.

FIG. 14B illustrates a case where the pointer PO is moved closer to the moving operation point MOP side. In this type of application, when the pointer PO falls below a preset approximation threshold on the application for a point to be selected, identification display is performed by changing the display mode to represent that the corresponding point is very close enough to be selected. In FIG. 14B, since the pointer PO is close to the moving operation point MOP, the display size of the moving operation point MOP is set to be larger, thereby identifying and displaying that the moving operation point MOP is in a selectable state. The white circle portion represented by the broken line in FIG. 14B represents the size of the moving operation point MOP before the identification display for convenience, and therefore may not be displayed during the actual display.

Figure 14C:
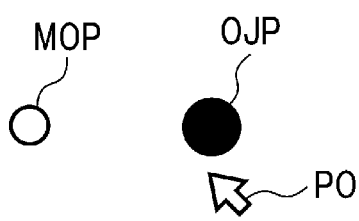
FIG. 14C is a diagram illustrating settings of a priority between the operation point and the figure object.

FIG. 14C illustrates a case where the pointer PO is moved closer to the point OJP of the figure object. Here, since the pointer PO is close to the point OJP, the display size of the point OJP is set to be larger, thereby identifying and displaying that the point OJP is in a selectable state.

Figure 14D:
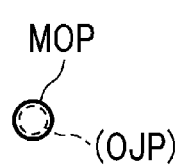
FIG. 14D is a diagram illustrating settings of a priority between the operation point and the figure object.

FIG. 14D illustrates a case where the moving operation point MOP and the point OJP overlap in the coordinates of the geometry pad DIA1, and the pointer PO is located at a sufficiently distant position. The white circle portion represented by the broken line in FIG. 14D represents the size of the point OJP for convenience, and therefore may not be displayed during the actual display.

As described above, since the layer structure is made such that the moving operation point MOP has a higher priority than the point OJP of the figure object, the black circle display of the overlapped point OJP is omitted, and only the moving operation point MOP is displayed.

Figure 14E:
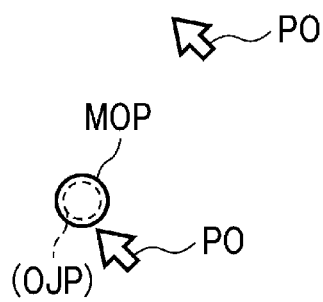
FIG. 14E is a diagram illustrating settings of a priority between the operation point and the figure object.

FIG. 14E illustrates a case where the moving operation point MOP and the point OJP overlap, and the pointer PO approaches the points. Since the layer structure is made such that the moving operation point MOP has a higher priority than the point OJP of the figure object, as in the case of FIG. 14B, it is identified and displayed that the moving operation point MOP is in a selectable state. As described above, when the moving operation point MOP and the point OJP of the figure object overlap, the moving operation point MOP can be selected with priority.

FIGS. 14A to 14E describe an example in which when the moving operation point MOP (or the rotating operation point ROP) and the point OJP of the figure object become selectable due to the proximity of the pointer PO, the identification display is performed to increase the size on the display. However, the present embodiment is not limited thereto, and it is possible to identify and display the setting states of points having different priorities in different display modes.

For example, when the pointer PO approaches one of the moving operation point MOP and the point OJP of the figure object, the identification display is performed so that the display size is increased as described above. Alternately, the display is blinked without changing the size when the pointer PO approaches. In this way, by changing the mode of representing the selection state when the pointer PO is brought close, even when the display state becomes a state where they partially overlap, it can be easily visually recognized which point is selected.

A display example in the case of displaying a plurality of protractor images PT on the geometry pad DIA1 will also be described.

Figure 15:
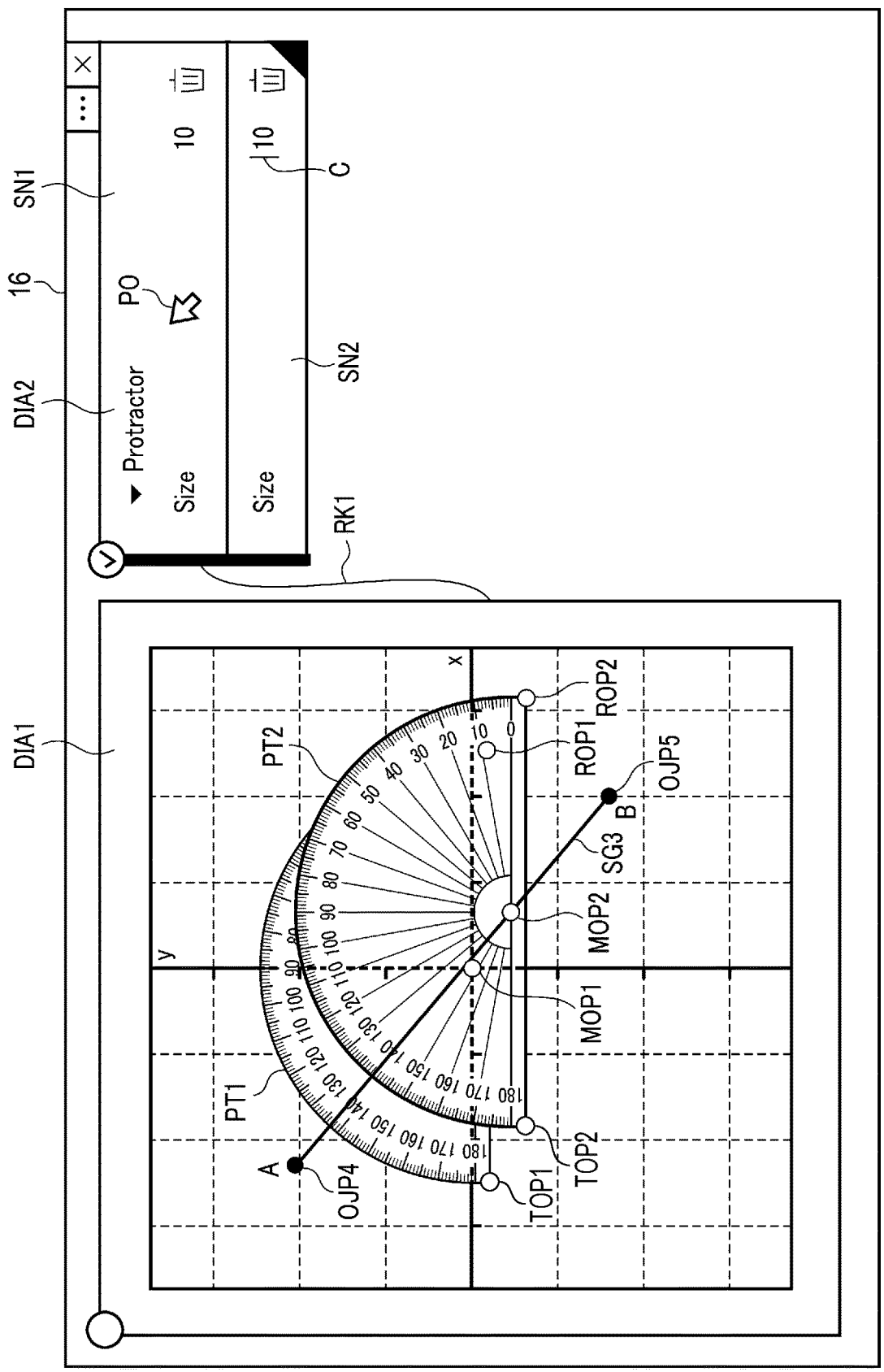
FIG. 15 is a diagram illustrating a display mode according to a priority order in a state where a plurality of protractor images are drawn and displayed according to the embodiment.
Figure 16:
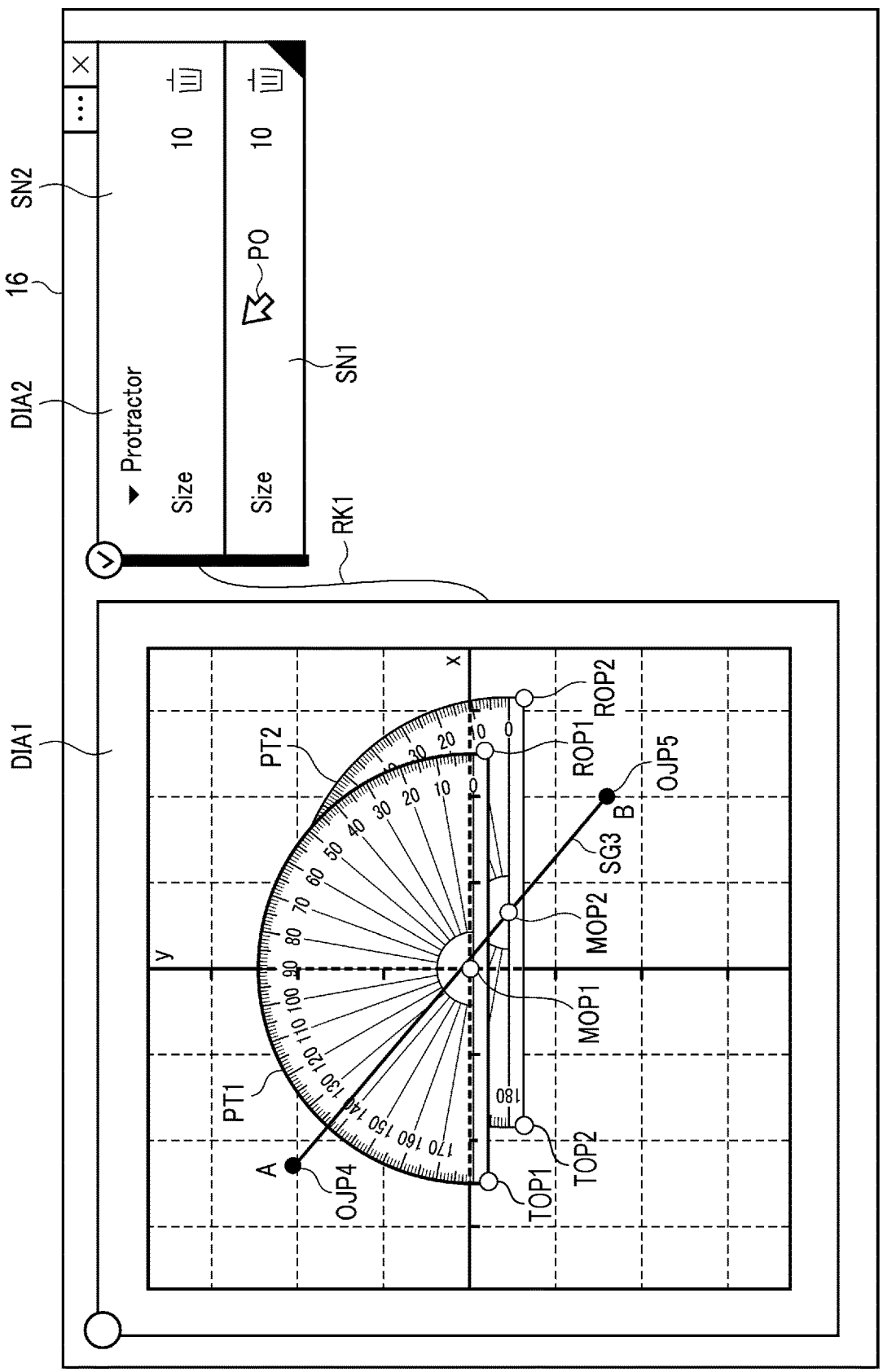
FIG. 16 is a diagram illustrating a display mode according to the priority order in a state where the plurality of protractor images are drawn and displayed according to the embodiment.

FIGS. 15 and 16 illustrate a state where a first protractor image PT1, a second protractor image PT2, points "A" OJP4 and "B" OJP5, a line segment SG3 connecting the points "A" OJP4 and "B" OJP5 of the figure object are drawn in the geometry pad DIA1.

In the geometry pad DIA1, since the protractor image PT2 is created after the protractor image PT1, the protractor image PT2 is displayed on the protractor image PT1. All the operation points MOP1, MOP2, ROP1, and ROP2 are displayed with priority above any of the two protractor images PT1 and PT2.

In one measuring tool information pad DIA2, a partial pad SN2 representing information on the protractor image PT2 is displayed in combination with a partial pad SN1 representing information on the protractor image PT1.

In FIG. 15, the operation target is on the measuring tool information pad DIA2 side, the cursor C is displayed immediately before the position of the numerical value "10" representing the size of the partial pad SN2 representing the information on the protractor image PT2 under the partial pad SN1 representing the information on the protractor image PT1, and the state in the middle of the operation of changing the size of the protractor image PT2, and the state where the pointer PO is positioned on the side of the partial pad SN1 representing the information of the protractor image PT are displayed.

In the geometry pad DIA1, the fact that the protractor image PT2 that is currently being changed in size is displayed with a higher priority than the protractor image PT1 and the protractor image PT2 is being edited is identified and displayed by being surrounded by a clearly thicker outline than the protractor image PT1.

In the present embodiment, when a plurality of protractor images are measured and displayed in an overlapping manner on the geometry pad DIA1, the positions of the partial pads in the measuring tool information pad DIA2 are constantly exchanged so that the associated partial pad is positioned lower in the measuring tool information pad DIA2, corresponding to the protractor image PT positioned above and preferentially displayed.

By performing an operation of exchanging the positions of the partial pads SN1 and SN2 in the measuring tool information pad DIA2, the example and order of the protractor images PT1 and PT2 in the geometry pad DIA1 can also be exchanged. Thus, even when the two protractor images PT1 and PT2 are displayed in an overlapping manner, it is possible to easily display any protractor image PT desired by a user.

FIG. 16 illustrates the result obtained by exchanging and displaying the protractor image PT1 to be positioned above the protractor image PT2 from a state where the pointer PO is positioned on the side of the partial pad SN1 representing the information of the protractor image PT1 illustrated in FIG. 15, by performing the operation in which the partial pad SN1 is lowered from the partial pad SN2 located therebelow by a drag operation.

In the geometry pad DIA1, the fact that the protractor image PT1 is displayed with priority on the protractor image PT2 which has been changed in size is identified and displayed by being surrounded by a clearly thick outline compared to the protractor image PT2.

In the measuring tool information pad DIA2, the fact that the partial pad SN1 representing the information of the protractor image PT1 is located below by the drag operation and has a higher priority than the partial pad SN2 representing the information of the protractor image PT2 is represented by the positional relationship thereof.

In the above-described embodiment, according to the size change process of the protractor image PT, the mode of the index is changed stepwise according to the magnification specified by the size change instruction, and the size of the protractor image PT is changed without step. However, the size of the protractor image PT may be changed stepwise. When the mode of the index is changed by changing the contrast, the size of the protractor image PT may be changed without step.

In the above-described embodiment, according to the shape change process of the protractor image PT, the shape and the mode of the index of the protractor image PT are changed without step according to the magnitude of the central angle specified by the shape change instruction, but may be changed stepwise. Specifically, assuming that the step value of the step is 10°, when the magnitude of the central angle specified by the shape change instruction crosses 70°, 80°, 90°, 100°, 110°, and the like, the shape and the mode of the index of the protractor image PT may be changed. Therefore, when the angle is 90° or more and less than 100°, the shape and the mode of the index of the protractor image PT may be the same regardless of the specified magnification. When the specified magnification is 100° or more and less than 110°, the shape and the mode of the index of the protractor image PT are the same regardless of the specified magnification, but may be different from the shape and the mode of the index of the protractor image PT when the specified magnification is 90° or more and less than 100°. The same applies to other numerical value ranges.

In other words, based on the numerical value range (numerical value range such as 80° or more and less than 90°, 90° or more and less than 100°, 100° or more and less than) 110° to which the magnitude (a numerical value representing the feature amount of the shape of the protractor image PT) of the central angle of the protractor image PT after the shape change belongs, the mode of the index (scale and numerical value label) after the shape change is specified, and the mode of the index of the protractor image PT is preferably changed to the specified mode of the index.

In the above embodiment, the protractor image PT has a scale and a numerical value as indices used for measurement, but may have at least one of the scale and the numerical value. In the first change process executed in response to the size change instruction, both the scale and the label of the angle numerical value are added according to the enlargement instruction or thinned out according to the reduction instruction, thereby changing the mode. However, the mode may be changed for only one of the scale and the label of the angle numerical value.

In the above embodiment, when it is determined that the size change instruction has been received, the mode of the index is changed to be increased by adding the index or to be reduced by deleting the index. When it is determined that the size change instruction has been received, the mode of the index may be changed by changing the contrast ratio of the second index among the plurality of indices to the first index or the background of the second index.

Here, the first index is a scale and a numerical value label that do not change the mode before and after the size change instruction among the plurality of indices, and the second index is a scale and a numerical value label that change the mode before and after the size change instruction among the plurality of indices. Specifically, when an instruction to change the magnification from a state of the equivalent magnification to a state of 1.5 times is issued as an enlargement instruction, as illustrated in FIG. 7, the large scale, the medium scale, and the small scale are not changed, but the step width of the numerical value labels is changed from 10° to 5°. In this case, the large scale, the medium scale, and the small scale are the first indices, and the numerical value labels are the second indices. Conversely, when an instruction to change the magnification from a state of the equivalent magnification to a state of 0.5 times is issued as a reduction instruction, the large scale and the medium scale are not changed, but the small scale is not displayed and the step width of the numerical value labels is also changed from 10° to 30°. In this case, the large scale and the medium scale are the first indices, and the small scale and the numerical value labels are the second indices. On the other hand, when an instruction to change the magnification from a state of 0.5 times to a state of 1.5 times is issued as an enlargement instruction, the large scale and the medium scale are not changed, but the small scale is changed from non-display to display at every 1° and the step size of the numerical value labels is changed from 30° to 5°. In this case, the large scale and the medium scale are the first indices, and the small scale and the numerical value labels are the second indices. As described above, the first index and the second index may change according to the change in magnification specified by the size change instruction.

When it is determined that an enlargement instruction has been received as the size change instruction, the contrast ratio of the second index among the plurality of indices with respect to the first index or the background thereof may be increased while maintaining the contrast of the first index among the plurality of indices. As a result, since the size of the protractor image PT is increased and the visibility of the second index is increased, a finer measurement is easily performed.

Conversely, when it is determined that a reduction instruction has been received as the size change instruction, the contrast ratio of the second index among the plurality of indices with respect to the first index or the background thereof may be lowered while maintaining the contrast of the first index among the plurality of indices. As a result, since the size of the protractor image PT decreases and the visibility of the second index decreases, the display of the indices is too fine or the indices overlap each other. Thus, the plurality of indices including the first index and the second index are difficult to be seen, and it is possible to prevent the measurement using the protractor image PT from becoming difficult.

In other words, the mode of the index (the scale and the numerical value label) after the size change is specified based on the numerical value range to which the magnification after the size change belongs (a numerical number range such as less than 0.75, 0.75 or more and less than 1.25, or 1.25 or more), and the mode of the index of the protractor image PT may be changed to the specified mode of the index.

In the above embodiment, the protractor image PT is obtained by executing the process for drawing the protractor. However, the protractor image PT may be obtained by the terminal 10 reading out the protractor image PT stored in advance in the external storage device or the protractor image PT downloaded from the Internet and stored in advance in the storage 14.

In the above embodiment, the protractor image changing program is executed on the web browser of the terminal 10, but at least a part or all of the program may be executed by the web server 20. For example, the processor 11 of the terminal 10 may be configured to execute at least the process for displaying the protractor image PT, and the web server 20 may be configured to execute at least the output process of the protractor image. In this case, the acquisition process, the first change process, and the second change process of the protractor image PT may be configured to be executed by either the processor 11 of the terminal 10 or the web server 20. When at least a part of the protractor image changing program is executed by the web server 20, the web server 20 may receive a corresponding request signal from the terminal 10 as respective instructions, such as a size change instruction, a shape change instruction, a rotation instruction, a figure display instruction, or a protractor display instruction.

In the above embodiment, the protractor image PT is displayed and output on the display 16 of the terminal 10, but may be output to an external display. When the web server 20 executes the acquisition process, the first change process, and the second change process of the protractor image PT, outputting the changed protractor image PT may include that the changed protractor image PT is transmitted to the terminal 10 via the network NW in order to display the changed protractor image PT on the display 16 of the terminal 10. When the protractor image PT is obtained or output, the protractor image PT or data thereof may be obtained or output.

In the above embodiment, new display data after the change of the protractor image PT is created along with the size change process or the shape change process of the protractor image PT. However, any of the switching images corresponding to the content of the instruction may be specified as the changed protractor image PT. In this case, when the terminal 10 performs the first change process and the second change process, a plurality of switching images may be stored in advance in the storage 14 of the terminal 10. When the web server 20 executes the first change process and the second change process, a plurality of switching images are stored in advance in the storage of the web server 20, and any one of the switching images is specified among the plurality of switching images, and then, may be transmitted to the terminal 10 via the network NW in a subsequent output process. In particular, such a method is effective when both or any of the size and the mode of the index of the protractor image PT is changed stepwise.

In the present embodiment, the case where the protractor image PT is drawn and displayed in the geometry pad DIA1 as the image of the measuring tool has been described. However, the present invention is not limited thereto, and images of other measuring tools, for example, a ruler image may be added to display.

As described above in detail, according to the present embodiment, when a size change instruction or a shape change instruction for an image of a measuring instrument displayed on a screen of a display is received, a scale display mode can be appropriately changed and displayed according to the content of the size change instruction or the shape change instruction.

The present invention is not limited to the above-described embodiment, and can be variously modified in an implementation stage without departing from the spirit of the invention. The embodiments may be implemented in appropriate combinations as much as possible, in which case the combined effects can be obtained. The above embodiments include inventions at various stages, and various inventions can be extracted by appropriate combinations of a plurality of disclosed components. For example, even with some components deleted from all the components illustrated in the embodiment, when the problem described in the paragraph of the problem to be solved by the invention can be solved, and the effects described in the paragraph of the effect of the invention can be achieved, a configuration from which the components are deleted can be extracted as an invention.

What is claimed is:

1. A non-transitory computer-readable medium storing a program for causing one or more processors to execute a process, the process comprising:
   acquiring an image of a protractor having a plurality of indices used for measurement;
   determining whether a size change instruction or a shape change instruction for the image of the protractor has been received;
   when it is determined that the size change instruction or the shape change instruction for the image of the protractor has been received, performing a first change process for changing a size or shape of the image of the protractor based on whether the received instruction is the size change instruction or the shape change instruction, and a second change process for changing a mode of the plurality of indices of the image of the protractor to a mode based on the received instruction; and
   causing a display to output the image of the protractor in which the size or shape is changed and the mode of the plurality of indices is changed, wherein
   when the second change process includes a process for changing a contrast ratio of a second index among the plurality of indices with respect to a first index or a background of the second index while maintaining a contrast of the first index among the plurality of indices.

2. The non-transitory computer-readable medium according to claim 1, wherein
   the determining comprises determining whether an enlargement instruction or a reduction instruction for the image of the protractor has been received as the size change instruction,
   when it is determined that the enlargement instruction has been received, the contrast ratio of the second index among the plurality of indices with respect to the first index or the background of the second index is increased while maintaining the contrast of the first index among the plurality of indices, as the second change process,
   when it is determined that the reduction instruction has been received, the contrast ratio of the second index among the plurality of indices with respect to the first index or the background thereof is lowered while maintaining the contrast of the first index among the plurality of indices, as the second change process.

3. The non-transitory computer-readable medium according to claim 2, wherein
   when it is determined that the enlargement instruction has been received, the size of the image of the protractor is enlarged as the first change process, and
   when it is determined that the reduction instruction has been received, the size of the image of the protractor is reduced as the first change process.

4. The non-transitory computer-readable medium according to claim 1, wherein
   the determining comprises determining whether an enlargement instruction or reduction instruction of the image of the protractor has been received as the size change instruction,
   when it is determined that the enlargement instruction has been received, the mode of the plurality of indices is changed such that the plurality of indices increase, as the second change process, and
   when it is determined that the reduction instruction has been received, the mode of the plurality of indices is changed such that the plurality of indices decrease, as the second change process.

5. The non-transitory computer-readable medium according to claim 4, wherein
   when it is determined that the enlargement instruction has been received, the mode of the plurality of indices is changed by further adding an index to the plurality of indices, as the second change process, and
   when it is determined that the reduction instruction has been received, the mode of the plurality of indices is changed by deleting a predetermined index from the plurality of indices, as the second change process.

6. The non-transitory computer-readable medium according to claim 1, wherein
   the determining comprises determining whether a measurement range change instruction has been received as the shape change instruction, and
   when it is determined that the measurement range change instruction has been received, the image of the protractor is transformed as the first change process, and a range of the plurality of indices included in the image of the protractor is changed as the second change process.

7. The non-transitory computer-readable medium according to claim 6, wherein the first change process includes specifying, based on the received measurement range change instruction, a magnitude of a central angle of the protractor after the shape change, and transforming the shape of the image of the protractor after the change to a shape corresponding to the specified magnitude of the central angle.

8. The non-transitory computer-readable medium according to claim 6, wherein the measurement range change instruction includes an operation of moving the image of the protractor in addition to an operation of the size change instruction and an operation of the shape change instruction.

9. The non-transitory computer-readable medium according to claim 1, wherein the process executed by the one or more processors further comprises:
   further outputting, on the display and in addition to a first image representing the protractor, an area image for receiving an operation on the protractor.

10. The non-transitory computer-readable medium according to claim 9, wherein
    when the operation of the shape change instruction is performed on a position that overlaps the second image, the operation is validated; and
    when the operation of the shape change instruction is performed on a position that overlaps the first image and does not overlap the second image, the operation is invalidated.

11. The non-transitory computer-readable medium according to claim 1, wherein the process executed by the one or more processors further comprises:
    outputting to display on the display the image of the protractor and information related to the image of the protractor associated with each other, in response to receiving a protractor display instruction;

outputting to display on the display an image of another protractor and information related to the image of the another protractor associated with each other in a manner that the image of the another protractor and the information related to the image of the another protractor overlap the image of the protractor and the information related to the image of the protractor, in response to further receiving the protractor display instruction after outputting of the image of the protractor and the information related to the image of the protractor, the image of the another protractor and the information related to the image of the another protractor being different from the image of the protractor and the information related to the protractor;

after outputting the image of the another protractor and the information related to the image of the another protractor, determining whether an operation of exchanging the positions of the information related to the image of the protractor and the information related to the image of the another protractor has been received; and outputting to display on the display the image of the protractor in a manner that the image of the protractor overlaps on the image of the another protractor, when it is determined that the operation of exchanging the positions of the information related to the image of the protractor and the information related to the image of the another protractor has been received.

12. A protractor image changing apparatus comprising:
one or more processors; and
one or more memories configured to store instructions executable by the one or more processors,
wherein the one or more processors, under control of the instructions, performs:
acquiring an image of a protractor having a plurality of indices used for measurement;
determining whether a size change instruction or a shape change instruction for the image of the protractor has been received;
when it is determined that the size change instruction or the shape change instruction for the image of the protractor has been received, performing a first change process for changing a size or shape of the image of the protractor based on whether the received instruction is the size change instruction or the shape change instruction, and a second change process for changing a mode of the plurality of indices of the image of the protractor to a mode based on the received instruction; and
causing a display to output the image of the protractor in which the size or shape is changed and the mode of the plurality of indices is changed, wherein
when the second change process includes a process for changing a contrast ratio of a second index among the plurality of indices with respect to a first index or a background of the second index while maintaining a contrast of the first index among the plurality of indices.

13. A server apparatus configured to transmit a protractor image changing program to a client terminal capable of communicating with the server apparatus via a network, wherein
the client terminal performs a process based on the protractor image changing program, the process comprising:
acquiring an image of a protractor having a plurality of indices used for measurement;
determining whether a size change instruction or a shape change instruction for the image of the protractor has been received;
when it is determined that the size change instruction or the shape change instruction for the image of the protractor has been received, performing a first change process for changing a size or shape of the image of the protractor based on whether the received instruction is the size change instruction or the shape change instruction, and a second change process for changing a mode of the plurality of indices of the image of the protractor to a mode based on the received instruction; and
causing a display to output the image of the protractor in which the size or shape is changed and the mode of the plurality of indices is changed, wherein
when the second change process includes a process for changing a contrast ratio of a second index among the plurality of indices with respect to a first index or a background of the second index while maintaining a contrast of the first index among the plurality of indices.

14. A protractor image changing system including a server apparatus and a client terminal that are capable of communicating via a network, wherein:
the client terminal performs a process according to a protractor image changing program, the process comprising:
determining whether a size change instruction or a shape change instruction for the image of the protractor has been received;
when it is determined that the size change instruction or the shape change instruction for the image of the protractor has been received, performing a first change process for changing a size or shape of the image of the protractor based on whether the received instruction is the size change instruction or the shape change instruction, and a second change process for changing a mode of a plurality of indices of the image of the protractor to a mode based on the received instruction; and
causing a display to output the image of the protractor in which the size or shape is changed and the mode of the plurality of indices is changed, wherein
when the second change process includes a process for changing a contrast ratio of a second index among the plurality of indices with respect to a first index or a background of the second index while maintaining a contrast of the first index among the plurality of indices.

15. A server apparatus that communicates with a client terminal via a network and performs at least a part of a process included in a protractor image changing method, wherein
the client terminal performs a process according to a protractor image changing program, the process comprising:
determining whether a size change instruction or a shape change instruction for the image of the protractor has been received;
when it is determined that the size change instruction or the shape change instruction for the image of the protractor has been received, performing a first change process for changing a size or shape of the image of the protractor based on whether the received instruction is the size change instruction or the shape change instruction, and a second change process for changing a mode of a plurality of indices of the image of the protractor to a mode based on the received instruction; and causing a display to output the image of the protractor in which the size or shape is changed and the mode of the plurality of indices is changed, wherein when the second change process includes a process for changing a contrast ratio of a second index among the plurality of indices with respect to a first index or a background of the second index while maintaining a contrast of the first index among the plurality of indices.

16. A protractor image changing method comprising:

acquiring an image of a protractor having a plurality of indices used for measurement;

determining whether a size change instruction or a shape change instruction for the image of the protractor has been received;

when it is determined that the size change instruction or the shape change instruction for the image of the protractor has been received, performing a first change process for changing a size or shape of the image of the protractor based on whether the received instruction is the size change instruction or the shape change instruction, and a second change process for changing a mode of the plurality of indices of the image of the protractor to a mode based on the received instruction; and causing a display to output the image of the protractor in which the size or shape is changed and the mode of the plurality of indices is changed, wherein when the second change process includes a process for changing a contrast ratio of a second index among the plurality of indices with respect to a first index or a background of the second index while maintaining a contrast of the first index among the plurality of indices.

* * * * *